United States Patent
Backhaus-Ricoult et al.

(10) Patent No.: US 11,591,265 B2
(45) Date of Patent: Feb. 28, 2023

(54) BATCH COMPOSITIONS COMPRISING PRE-REACTED INORGANIC PARTICLES AND METHODS OF MANUFACTURE OF GREEN BODIES THEREFROM

(71) Applicant: CORNING INCORPORATED, Corning, NY (US)

(72) Inventors: Monika Backhaus-Ricoult, Bourron (FR); Adriane Marie Divens-Dutcher, Painted Post, NY (US); Elizabeth Marie Vileno, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/760,154

(22) PCT Filed: Oct. 31, 2018

(86) PCT No.: PCT/US2018/058418
§ 371 (c)(1),
(2) Date: Apr. 29, 2020

(87) PCT Pub. No.: WO2019/089735
PCT Pub. Date: May 9, 2019

(65) Prior Publication Data
US 2021/0363064 A1 Nov. 25, 2021

Related U.S. Application Data

(60) Provisional application No. 62/579,585, filed on Oct. 31, 2017, provisional application No. 62/579,579, filed on Oct. 31, 2017.

(51) Int. Cl.
*C04B 35/195* (2006.01)
*C04B 35/185* (2006.01)
(Continued)

(52) U.S. Cl.
CPC .......... *C04B 35/195* (2013.01); *C04B 35/185* (2013.01); *C04B 35/478* (2013.01);
(Continued)

(58) Field of Classification Search
CPC ............ C04B 35/478; C04B 35/62655; C04B 38/0006; C04B 2235/3234;
(Continued)

(56) References Cited

U.S. PATENT DOCUMENTS

| 4,295,892 A | 10/1981 | Matsuhisa |
| 4,327,188 A | 4/1982 | Endo et al. |

(Continued)

FOREIGN PATENT DOCUMENTS

| CN | 1942413 A | 4/2007 |
| CN | 101053719 A | 10/2007 |

(Continued)

OTHER PUBLICATIONS

Benbow et al., "Paste flow and extrusion", Oxford series on advanced manufacturing, Oxford, 1993, pp. 153.
(Continued)

*Primary Examiner* — Noah S Wiese
(74) *Attorney, Agent, or Firm* — Daniel J. Greenhalgh

(57) ABSTRACT

Batch compositions containing pre-reacted inorganic spheroidal particles, small amount of fine inorganic particles ("fines"), and an extremely large amount of liquid vehicle. The batch compositions contain pre-reacted inorganic particles having a particle size distribution with 20 µm≤D50≤100 µm, D90≤100 µm, and D5≥10 µm; less than 20 wt % of fine inorganic particles (fines) whose particle distribution(s) have a median diameter of less than 5 µm; and a liquid vehicle in a weight percent (LV %≥28%) by super-addition to all inorganic particles in the batch composition. Fast extruding batch compositions having
(Continued)

extremely high Tau Y/Beta ratios are provided. Green bodies, such as green honeycomb bodies and methods of manufacturing green honeycomb bodies are provided, as are other aspects.

24 Claims, 9 Drawing Sheets

(51) Int. Cl.
    *C04B 35/478*         (2006.01)
    *C04B 35/626*         (2006.01)
    *C04B 38/00*           (2006.01)
    *C04B 38/06*           (2006.01)

(52) U.S. Cl.
    CPC .. *C04B 35/62645* (2013.01); *C04B 35/62655* (2013.01); *C04B 38/0006* (2013.01); *C04B 38/067* (2013.01); *C04B 38/0655* (2013.01); *C04B 2235/3234* (2013.01); *C04B 2235/3463* (2013.01); *C04B 2235/528* (2013.01); *C04B 2235/5296* (2013.01); *C04B 2235/5436* (2013.01); *C04B 2235/5463* (2013.01); *C04B 2235/6021* (2013.01); *C04B 2235/76* (2013.01)

(58) Field of Classification Search
    CPC ...... C04B 2235/3463; C04B 2235/528; C04B 2235/5436; C04B 2235/6021; C04B 2235/76

See application file for complete search history.

(56) References Cited

U.S. PATENT DOCUMENTS

| | | | |
|---|---|---|---|
| 4,789,501 A | 12/1988 | Day et al. | |
| 5,173,455 A | 12/1992 | Terbot et al. | |
| 5,406,058 A | 4/1995 | Lipp | |
| 5,545,243 A | 8/1996 | Kotani et al. | |
| 5,863,491 A | 1/1999 | Wang | |
| 5,976,478 A | 11/1999 | Swanson et al. | |
| 6,017,994 A | 1/2000 | Carter et al. | |
| 6,027,684 A | 2/2000 | Gheorghiu et al. | |
| 6,048,199 A | 4/2000 | Dull et al. | |
| 6,080,345 A | 6/2000 | Chalasani et al. | |
| 6,089,860 A | 7/2000 | Dull et al. | |
| 6,207,101 B1 | 3/2001 | Beall et al. | |
| 6,287,509 B1 | 9/2001 | Gheorghiu | |
| 6,325,963 B1 | 12/2001 | Dull et al. | |
| 6,413,895 B1* | 7/2002 | Merkel ............... | B01D 39/2068 264/177.12 |
| 6,551,628 B1 | 4/2003 | Watson et al. | |
| 6,589,465 B2 | 7/2003 | Kumazawa et al. | |
| 6,620,751 B1 | 9/2003 | Ogunwumi | |
| 6,849,181 B2 | 2/2005 | Ogunwumi et al. | |
| 6,932,959 B2 | 8/2005 | Sterte et al. | |
| 7,166,552 B2 | 1/2007 | Fukuda et al. | |
| 7,294,164 B2 | 11/2007 | Merkel | |
| 7,381,681 B2 | 6/2008 | Nilsson et al. | |
| 7,596,885 B2 | 10/2009 | Adrian et al. | |
| 7,727,613 B2 | 6/2010 | Suwabe et al. | |
| 7,732,366 B2 | 6/2010 | Ohno et al. | |
| 7,754,638 B2 | 7/2010 | Ogunwumi et al. | |
| 7,964,262 B2 | 6/2011 | Brocheton et al. | |
| 7,976,768 B2 | 7/2011 | Brady et al. | |
| 7,981,188 B2 | 7/2011 | Miao et al. | |
| 8,038,956 B2 | 10/2011 | Li | |
| 8,101,117 B2 | 1/2012 | Addiego et al. | |
| 8,114,354 B2 | 2/2012 | Li | |
| 8,119,234 B2 | 2/2012 | Backhaus-Ricoult et al. | |
| 8,138,108 B2 | 3/2012 | Tepesch et al. | |
| 8,187,525 B2 | 5/2012 | Custer et al. | |
| 8,298,311 B2* | 10/2012 | Chen ............... | F01N 3/022 55/523 |
| 8,394,167 B2 | 3/2013 | Merkel et al. | |
| 8,450,227 B2 | 5/2013 | McCauley et al. | |
| 8,454,887 B2 | 6/2013 | Likitvanichkul | |
| 8,481,900 B2 | 7/2013 | Pitsakis | |
| 8,591,287 B2 | 11/2013 | Folmar et al. | |
| 8,591,623 B2* | 11/2013 | Beall ............... | C04B 35/478 55/523 |
| 8,691,361 B2 | 4/2014 | Okazaki et al. | |
| 8,715,807 B2 | 5/2014 | Boussant-Roux et al. | |
| 8,729,436 B2 | 5/2014 | Adrian et al. | |
| 8,920,705 B2 | 12/2014 | Suzuki et al. | |
| 8,974,724 B2 | 3/2015 | Day et al. | |
| 9,221,192 B2 | 12/2015 | Beall et al. | |
| 9,335,093 B2 | 5/2016 | Feldman et al. | |
| 9,376,347 B2 | 6/2016 | Backhaus-Ricoult et al. | |
| 9,429,361 B2 | 8/2016 | Harihara et al. | |
| 9,441,517 B2* | 9/2016 | Huang ............... | F01N 3/2066 |
| 9,452,578 B2 | 9/2016 | Bronfenbrenner et al. | |
| 9,623,360 B2 | 4/2017 | Backhaus-Ricoult et al. | |
| 9,856,177 B2 | 1/2018 | Miao et al. | |
| 9,908,260 B2 | 3/2018 | Backhaus et al. | |
| 2001/0033038 A1 | 10/2001 | Sakaguchi et al. | |
| 2003/0007990 A1 | 1/2003 | Blankenship et al. | |
| 2004/0029707 A1 | 2/2004 | Beall et al. | |
| 2005/0161849 A1 | 7/2005 | Ohno et al. | |
| 2005/0191480 A1 | 9/2005 | Tao et al. | |
| 2007/0119135 A1 | 5/2007 | Miao et al. | |
| 2008/0047243 A1 | 2/2008 | Beall et al. | |
| 2008/0124423 A1 | 5/2008 | Peterson et al. | |
| 2008/0124516 A1 | 5/2008 | Noguchi et al. | |
| 2008/0125305 A1 | 5/2008 | Day et al. | |
| 2008/0237942 A1 | 10/2008 | Takamatsu | |
| 2009/0137382 A1 | 5/2009 | Merkel | |
| 2009/0140452 A1 | 6/2009 | Derosa et al. | |
| 2009/0143219 A1 | 6/2009 | Chou | |
| 2009/0143221 A1 | 6/2009 | Ogunwumi et al. | |
| 2009/0326279 A1 | 12/2009 | Tonkovich et al. | |
| 2010/0237007 A1 | 9/2010 | Merkel et al. | |
| 2010/0298114 A1 | 11/2010 | Maki et al. | |
| 2010/0317508 A1 | 12/2010 | Maki et al. | |
| 2011/0052906 A1 | 3/2011 | Itoi et al. | |
| 2011/0077143 A1 | 3/2011 | Tohma et al. | |
| 2011/0097582 A1 | 4/2011 | Tohma et al. | |
| 2011/0105318 A1 | 5/2011 | Raffy | |
| 2011/0121478 A1 | 5/2011 | Beall et al. | |
| 2011/0124484 A1 | 5/2011 | Maki et al. | |
| 2011/0124486 A1 | 5/2011 | Gallaher et al. | |
| 2011/0130276 A1 | 6/2011 | Backhaus-Ricoult et al. | |
| 2011/0138776 A1* | 6/2011 | Huang ............... | F01N 3/035 60/274 |
| 2011/0152075 A1 | 6/2011 | Raffy et al. | |
| 2011/0156323 A1 | 6/2011 | Maki et al. | |
| 2011/0236688 A1 | 9/2011 | Suzuki et al. | |
| 2011/0248106 A1 | 10/2011 | Maki et al. | |
| 2012/0096821 A1 | 4/2012 | Nemoto et al. | |
| 2012/0124953 A1 | 5/2012 | Raffy | |
| 2012/0134891 A1 | 5/2012 | Boger et al. | |
| 2012/0198805 A1 | 8/2012 | Iwasaki et al. | |
| 2012/0297830 A1 | 11/2012 | Backhaus-Ricoult et al. | |
| 2013/0111862 A1 | 5/2013 | Divens-Dutcher et al. | |
| 2013/0310247 A1 | 11/2013 | Linhart et al. | |
| 2014/0327186 A1 | 11/2014 | Cutler et al. | |
| 2014/0338296 A1 | 11/2014 | Backhaus-Ricoult et al. | |
| 2014/0342898 A1 | 11/2014 | Backhaus-Ricoult et al. | |
| 2015/0273727 A1 | 10/2015 | Noni et al. | |
| 2016/0251249 A1 | 9/2016 | Backhaus-Ricoult et al. | |
| 2016/0354760 A1 | 12/2016 | Suchanek | |
| 2017/0120498 A1 | 5/2017 | Brew et al. | |
| 2017/0304762 A1 | 10/2017 | Okazaki | |

FOREIGN PATENT DOCUMENTS

| | | |
|---|---|---|
| CN | 101343174 A | 1/2009 |
| CN | 101343175 A | 1/2009 |
| CN | 101495423 A | 7/2009 |
| CN | 101952222 A | 1/2011 |
| CN | 101970377 A | 2/2011 |
| CN | 101977871 A | 2/2011 |
| CN | 102015576 A | 4/2011 |

(56) References Cited

FOREIGN PATENT DOCUMENTS

| | | |
|---|---|---|
| CN | 102015579 A | 4/2011 |
| CN | 102131747 A | 7/2011 |
| CN | 102630184 A | 8/2012 |
| CN | 103003220 A | 3/2013 |
| CN | 104208961 A | 12/2014 |
| CN | 105392756 A | 3/2016 |
| CN | 105408283 A | 3/2016 |
| CN | 105473532 A | 4/2016 |
| EP | 0506475 A2 | 9/1992 |
| EP | 1207143 A2 | 5/2002 |
| EP | 1284943 A1 | 2/2003 |
| EP | 2043964 A1 | 4/2009 |
| EP | 2266932 A1 | 12/2010 |
| EP | 2319816 A1 | 5/2011 |
| EP | 2322492 A1 | 5/2011 |
| EP | 2335797 A1 | 6/2011 |
| EP | 2401242 A1 | 1/2012 |
| EP | 2402295 A1 | 1/2012 |
| EP | 2038236 B1 | 8/2013 |
| EP | 2999680 A2 | 3/2016 |
| EP | 3026034 A1 | 6/2016 |
| IN | 201105914 | 11/2012 |
| IN | 201107355 | 11/2012 |
| IN | 2011005417 | 11/2012 |
| IN | 201107802 | 12/2012 |
| IN | 201202094 | 4/2013 |
| JP | 52-123408 A | 10/1977 |
| JP | 56-089844 A | 7/1981 |
| JP | 04-324799 A | 11/1992 |
| JP | 08-072038 A | 3/1996 |
| JP | 09-085030 A | 3/1997 |
| JP | 11-009925 A | 1/1999 |
| JP | 3274027 B2 | 4/2002 |
| JP | 2003-040691 A | 2/2003 |
| JP | 2006-096634 A | 4/2006 |
| JP | 2009-006262 A | 1/2009 |
| JP | 2009-190968 A | 8/2009 |
| JP | 2009-227580 A | 10/2009 |
| JP | 2009-542569 A | 12/2009 |
| JP | 2010-001184 A | 1/2010 |
| JP | 2010-013293 A | 1/2010 |
| JP | 2010-077008 A | 4/2010 |
| JP | 2010-510959 A | 4/2010 |
| JP | 2010-111551 A | 5/2010 |
| JP | 2010-111552 A | 5/2010 |
| JP | 2010-150054 A | 7/2010 |
| JP | 2010-159172 A | 7/2010 |
| JP | 2010-189204 A | 9/2010 |
| JP | 2010-228935 A | 10/2010 |
| JP | 2011-005408 A | 1/2011 |
| JP | 2011-005417 A | 1/2011 |
| JP | 2011-504869 A | 2/2011 |
| JP | 2011-506237 A | 3/2011 |
| JP | 4824769 B2 | 11/2011 |
| JP | 2012-188346 A | 10/2012 |
| JP | 2013-512189 A | 4/2013 |
| JP | 2015-193497 A | 11/2015 |
| KR | 10-0931755 B1 | 12/2009 |
| PT | 107613 A | 10/2015 |
| WO | 98/43927 A2 | 10/1998 |
| WO | 01/79139 A1 | 10/2001 |
| WO | 2008/005291 A1 | 1/2008 |
| WO | 2008/027219 A2 | 3/2008 |
| WO | 2009/070218 A2 | 6/2009 |
| WO | 2009/070242 A1 | 6/2009 |
| WO | 2009/108299 A1 | 9/2009 |
| WO | 2009/108312 A2 | 9/2009 |
| WO | 2009/119748 A1 | 10/2009 |
| WO | 2009/122538 A1 | 10/2009 |
| WO | 2010/024383 A1 | 3/2010 |
| WO | 2010/098347 A1 | 9/2010 |
| WO | 2010/099369 A1 | 9/2010 |
| WO | 2011/150145 A2 | 12/2011 |
| WO | 2012/166222 A1 | 12/2012 |
| WO | 2014/189740 A1 | 11/2014 |
| WO | 2014/189741 A2 | 11/2014 |
| WO | 2014/189817 A1 | 11/2014 |
| WO | 2015/042499 A2 | 3/2015 |
| WO | 2015/193497 A1 | 12/2015 |
| WO | 2016/138192 A1 | 9/2016 |
| WO | 2017/210251 A1 | 12/2017 |
| WO | 2019/089735 A1 | 5/2019 |

OTHER PUBLICATIONS

Benbow et al., "The extrusion mechanics of pastes—the influence of paste formulation on extrusion parameters", Chemical Eng. Science, vol. 53, 2151, 1987.
Guo Haizhu, "Practical Refractory Materials Handbook"; Beijing; China Building Materials Industry Press, Aug. 2000, p. 421.
H.J. Alves et al., "Spray-dried Powder Granulometry: Influence on the Porous Microstructure of Polished Porcelain Tile", Bol. Soc. Esp. Ceram. V. 49, 4, 239-246 (2010).
Hu Baoyu et al; "Practical Technical Manual for Special Refractory Material"; Beijing Metallurgical Industry Press, Jun. 2004; pp. 315-317.
International Search Report and Written Opinion of the International Searching Authority; PCT/US2018/058418; dated Feb. 11, 2019; 11 Pages; European Patent Office.
Lyckfeldt et al., "Processing of porous ceramics by 'starch consolidation", Journal of the European Ceramic Society, vol. 18, Issue 2, 1998, pp. 131-140.
Qian Zhirong et al; "Practical Handbook of Refractory Materials"; Beijing: Metallurgical Industry Press, Sep. 1992, p. 169.
Sakamoto et al; "Development and Evaluation of Superporous Ceramics Bone Tissue Scaffold Materials With Triple Pore Structure A) Hydroxyapatite, B) Beta-Tricalcium Phosphate"; Bone Regeneration Chapter 13; www.intechopen.com; pp. 301-320.
Sakar, N., "Thermal gelation properties of methyl- and hydroxypropyl methylcellulose", J. Appl. Polymer Science, vol. 24, 1979, pp. 1073-1087.
Wall-Flow Monoliths, Dieselnet Technology Guide Jul. 1, 2004 (Jul. 1, 2004), pp. 1/16.
Yong Yang et al., "In situ porous alumina/alunimum titanate ceramic prepared by spark plasma sintering from nanostructured powders", Scripta Materialia, 60 (2009), pp. 578-581.
Donovan, John W. "Phase transitions of the starch-water system." Biopolymers: Original Research on Biomolecules 18.2 (1979): 263-275. (Year: 1979).
Eskin, NA Michael, and Fereidoon Shahidi. "Biochemistry of foods." (2012). Chapter on Starch Granules by Kequan Zhou and Liangli Yu. (Year: 2012).
Mücksch, Christian, and Herbert M. Urbassek. "Molecular dynamics simulation of free and forced BSA adsorption on a hydrophobic graphite surface." Langmuir 27.21 (2011): 12938-12943 (Year: 2011).

\* cited by examiner

BATCH COMPOSITIONS COMPRISING PRE-REACTED INORGANIC PARTICLES AND METHODS OF MANUFACTURE OF GREEN BODIES THEREFROM

RELATED APPLICATIONS

This application is a National Stage application under 35 U.S.C. § 371 of International Application No. PCT/US2018/058418 filed on Oct. 31, 2018 which claims the benefit of priority under 35 U.S.C. § 119 of U.S. Provisional Application Ser. No. 62/579,585 filed on Oct. 31, 2017 and U.S. Provisional Application Ser. No. 62/579,579, filed Oct. 31, 2017, the contents of which are relied upon and incorporated herein by reference in their entireties.

FIELD

The present disclosure relates to batch compositions comprising pre-reacted inorganic particles and methods of manufacturing green body articles therefrom.

BACKGROUND

Cordierite and aluminum titanate-based porous ceramic honeycomb bodies have been used in catalytic converters and particulate filters for diesel and gasoline engine exhaust aftertreatment.

Such ceramic honeycomb bodies may be manufactured by extruding a plasticized batch composition of inorganic and organic materials and a liquid vehicle through an extrusion die of an extruder to produce a wet green honeycomb body. The wet green honeycomb body may be dried and fired to produce the porous ceramic honeycomb bodies.

SUMMARY

Illustrative embodiments of the present disclosure are directed to a batch composition. The batch composition comprises pre-reacted inorganic spheroidal particles having a narrow particle size distribution of:

20 µm≤$D_{50}$≤50 µm,
$D_{90}$≤100 µm, and
$D_{10}$≥5 µm;

less than 20 wt % of fine inorganic particles by super-addition to a total weight of the pre-reacted inorganic spheroidal particles in the batch composition, where the fine inorganic particles having a median diameter of less than 5 µm; and LV %≥28 in wt % by super-addition to all inorganic particles in the batch composition;

wherein LV % is liquid vehicle percent, 90% of the pre-reacted inorganic particles in the particle size distribution have a diameter of equal to or less than $D_{90}$, 10% of the pre-reacted inorganic particles have a diameter of equal to or less than $D_{10}$, and $D_{50}$ is a median particle diameter of the particle size distribution.

In some embodiments, the pre-reacted inorganic spheroidal particles comprise 20 µm≤$D_{50}$≤45 µm.

In some embodiments, the pre-reacted inorganic spheroidal particles comprise 25 µm≤$D_{50}$≤45 µm.

In some embodiments, the batch composition comprises $D_{90}$≤75 µm.

In some embodiments, the batch composition comprises $D_{90}$≤65 µm.

In some embodiments, the batch composition comprises $D_{10}$≥10 µm.

In some embodiments, the batch composition comprises $D_{10}$≥25 µm.

In some embodiments, the batch composition comprises $D_{90}$≤75 µm and $D_{10}$≥5 µm.

In some embodiments, the batch composition comprises $D_{90}$≤65 µm and $D_{10}$≥5 µm.

In some embodiments, the batch composition comprises $D_{90}$≤70 µm and $D_{10}$≥10 µm.

In some embodiments, the pre-reacted inorganic spheroidal particles comprise dB≤2.00, wherein $d_B=(D_{90}-D_{10})/D_{50}$.

In some embodiments, the pre-reacted inorganic spheroidal particles comprise dB≤1.00.

In some embodiments, the pre-reacted inorganic spheroidal particles comprise dB≤0.90.

In some embodiments, the pre-reacted inorganic spheroidal particles comprise dB≤0.80.

In some embodiments, the batch composition comprises less than 15 wt % of fine inorganic particles having a fine particle size distribution with a median diameter of less than 5 µm.

In some embodiments, the batch composition comprises less than 10 wt % of fine inorganic particles having a median diameter of less than 5 µm.

In some embodiments, the fine inorganic particles in the batch composition comprise fine alumina and fine silica wherein each comprises a median diameter of less than 2 µm.

In some embodiments, the fine inorganic particles in the batch composition comprise fine alumina and colloidal silica, each having particle size distributions with a median diameter of less than 1 µm.

In some embodiments, the batch composition comprises a ratio of a total weight of the fine inorganic particles in the batch composition to a total weight of the pre-reacted inorganic spheroidal particles in the batch composition of between 3:97 and 20:80.

In some embodiments, the pre-reacted inorganic spheroidal particles comprise an AR≤1.2, wherein AR is an average aspect ratio as measured across a first width having a largest dimension divided by second width having a smallest dimension across the pre-reacted inorganic spheroidal particles.

In some embodiments, the pre-reacted inorganic spheroidal particles are formed by a spray-drying process.

In some embodiments, a weight percent of the liquid vehicle is greater than or equal to 30 wt % by super-addition based on a total weight of all inorganic particles in the batch composition.

In some embodiments, a weight percent of the liquid vehicle is greater than or equal to 35 wt % by super-addition based on a total weight of all inorganic particles in the batch composition.

In some embodiments, a weight percent of the liquid vehicle is greater than or equal to 40 wt % by super-addition based on a total weight of all inorganic particles in the batch composition.

In some embodiments, a weight percent of the liquid vehicle is greater than or equal to 45 wt % by super-addition based on a total weight of all inorganic particles in the batch composition.

In some embodiments, a weight percent of the liquid vehicle is greater than or equal to 28 wt % and less than or equal to 50 wt % by super-addition based on a total weight of all inorganic particles in the batch composition.

In some embodiments, the batch composition comprises a combination of starch and graphite as pore formers.

In some embodiments, the batch composition comprises a combination of: pea starch as a pore former in an amount between 5 wt % and 20 wt % by super-addition to all inorganic particles in the batch composition, and graphite as a pore former in an amount between 1 wt % and 10 wt % by super-addition to all the inorganic particles in the batch composition.

In some embodiments, the batch composition comprises a spherical polymer pore former.

In some embodiments, the batch composition comprises a lubricant in an amount between 0.5 wt % to 2.5 wt % by super-addition to the weight of all the inorganic particles in the batch composition.

In some embodiments, the batch composition comprises an organic binder in an amount of between 4.0 wt % to 8.0 wt % by super-addition to the weight of all the inorganic particles in the batch composition.

In some embodiments, the organic binder comprises a combination of a methylcellulose binder and a hydroxymethylcellulose binder, with between about 3.0 wt % SAT to 6.0 wt % SAT of the methylcellulose binder, and between about 1.5 wt % SAT to 3.0 wt % SAT of the hydroxymethylcellulose binder, wherein SAT is defined as by super-addition to a weight of all inorganic particles in the batch composition.

In some embodiments, the organic binder comprises only hydroxymethylcellulose binder as the organic binder in an amount between about 4.0 wt % SAT to 8.0 wt % SAT, wherein SAT is defined as by super-addition to a weight of all inorganic particles in the batch composition.

In some embodiments, the pre-reacted inorganic spheroidal particles comprise a predominant crystalline phase of aluminum titanate.

In some embodiments, the pre-reacted inorganic spheroidal particles comprise a predominant crystalline phase of aluminum titanate and a second crystalline phase of mullite.

In some embodiments, the pre-reacted inorganic spheroidal particles comprise a predominant crystalline phase of aluminum titanate and a second crystalline phase of feldspar.

In some embodiments, the pre-reacted inorganic particles comprise a first crystalline phase predominantly of a solid solution of aluminum titanate and magnesium dititanate, and a second crystalline phase comprising cordierite.

In some embodiments, the pre-reacted inorganic spheroidal particles comprise a predominant crystalline phase of aluminum titanate and a minor glass phase.

In some embodiments, the pre-reacted inorganic particles comprise a weight % on an oxide basis of from 4% to 10% MgO, from 40% to 55% $Al_2O_3$, from 25% to 44% $TiO_2$, and from 5 to 25% $SiO_2$.

In some embodiments, the batch composition comprises a liquid vehicle to organic binder ratio of ≥6.4%.

Illustrative embodiments of the present disclosure are also directed to a green honeycomb body comprising the batch composition according to any of the embodiments described above.

Illustrative embodiments of the present disclosure are further directed to a method of manufacturing a honeycomb body. The method comprises mixing a batch composition comprising pre-reacted inorganic spheroidal particles having a particle size distribution of:
20 μm≤$D_{50}$≤50 μm,
$D_{90}$≤100 μm, and
$D_{10}$≥5 μm,
less than 20 wt % of fine inorganic particles by super-addition to a total weight of the pre-reacted inorganic spheroidal particles in the batch composition, where the fine inorganic particles have a median diameter of less than 5 μm, and LV %≥28 in wt % by super-addition to all inorganic particles in the batch composition, wherein 90% of the pre-reacted inorganic spheroidal particles have a diameter of less than $D_{90}$, 10% of the pre-reacted inorganic spheroidal particles have a diameter of less than $D_{10}$, and $D_{50}$ is a median particle diameter. The method further comprises shaping the batch composition into a wet green honeycomb body by extrusion, wherein the batch composition comprises Tau Y/Beta≥2.0, Tau Y is a measure of batch stiffness, and Beta is a friction coefficient of the batch composition.

In some embodiments, Tau Y/Beta≥3.0.
In some embodiments, Tau Y/Beta≥4.0.
In some embodiments, Tau Y/Beta≥5.0.
In some embodiments, Tau Y/Beta≥6.0.
In some embodiments, Tau Y/Beta≥7.0.
In some embodiments, Tau Y/Beta≥8.0.
In some embodiments, Tau Y/Beta≥10.0.

In some embodiments, the shaping comprises extrusion and a $T^{onset}$ during the extrusion of greater than or equal to 47° C.

In some embodiments, the method comprises a $T^{onset}$ during the extrusion of greater than or equal to 50° C.

In some embodiments, the method comprises a $T_{onset}$ during the extrusion of greater than or equal to 55° C.

In some embodiments, the method comprises drying the wet green honeycomb body to form a dried green honeycomb body; and firing the dried green honeycomb body to form a porous ceramic honeycomb body.

Illustrative embodiments of the present disclosure are also directed to a method of manufacturing a honeycomb body. The method comprises mixing a batch composition comprising pre-reacted inorganic spheroidal particles and less than 20 wt % of fine inorganic particles by super-addition to a total weight of the pre-reacted inorganic spheroidal particles in the batch composition, where the fine inorganic particles have a median diameter of less than 5 μm, and an LV %≥28 in wt % by super-addition to all inorganic particles in the batch composition. The method further comprises shaping the batch composition into a wet green honeycomb body by extrusion wherein the batch composition comprises a Tau Y/Beta≥2.0, Tau Y is a measure of batch stiffness, and Beta is a friction coefficient of the batch composition.

Illustrative embodiments of the present disclosure further directed to another batch composition. The batch composition comprises pre-reacted inorganic spheroidal particles having a narrow particle size distribution of:
20 μm≤$D_{50}$≤50 μm,
$D_{90}$≤100 μm, and
$D_{10}$≥5 μm;
less than 20 wt % of fine inorganic particles by super-addition to a total weight of the pre-reacted inorganic spheroidal particles in the batch composition, the fine inorganic particles having a median diameter of less than 5 μm;
LV %≥28 in wt % by super-addition to all inorganic particles in the batch composition; and
Tau Y/Beta≥2.0;
wherein LV % is liquid vehicle percent, 90% of the pre-reacted inorganic particles in the particle size distribution have a diameter of equal to or less than $D_{90}$, 10% of the pre-reacted inorganic particles have a diameter of equal to or less than $D_{10}$, $D_{50}$ is a median particle diameter of the particle size distribution, Tau Y is a measure of batch stiffness, and Beta is a friction coefficient of the batch composition.

Additional features of the disclosure will be set forth in the description which follows, and in part will be apparent from the description, or may be learned by practice of the disclosure. It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the disclosure, and are incorporated in and constitute a part of this specification, illustrate example embodiments of the disclosure, and together with the description serve to explain the principles of the disclosure.

DETAILED DESCRIPTION

Figure 1:
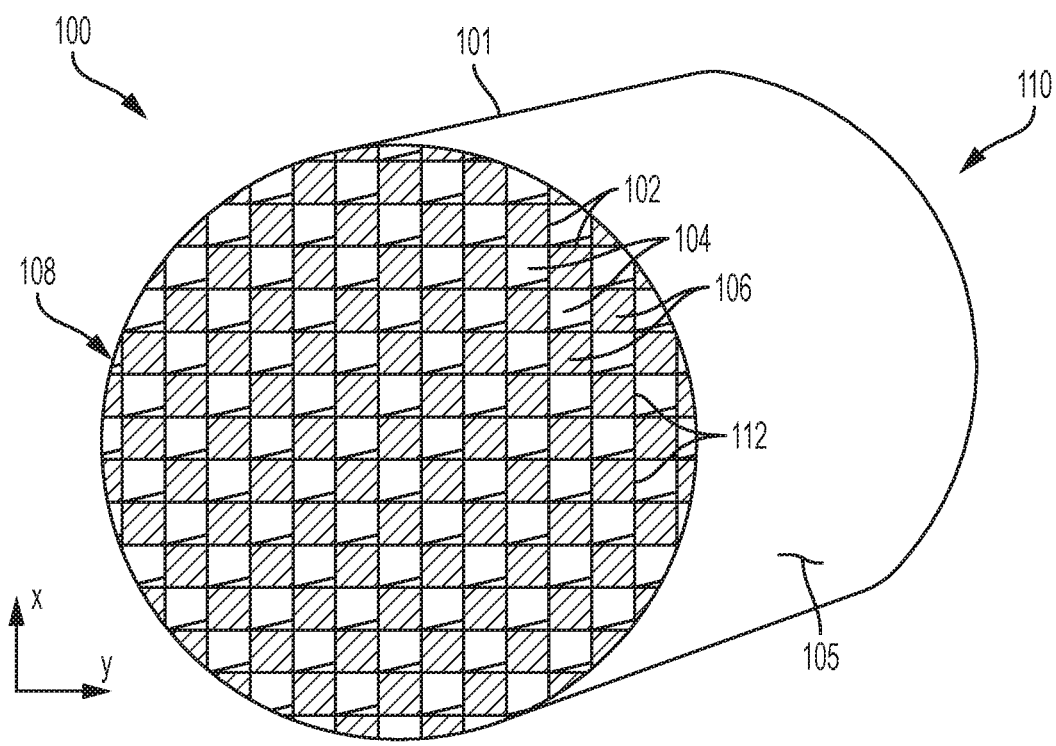
FIG. 1 illustrates an isometric view of a porous ceramic honeycomb body produced from the batch composition and embodied as a particulate filter according to one or more embodiments.

Embodiments of the disclosure are described more fully hereinafter with reference to the accompanying drawings. This disclosure may, however, be embodied in many different forms and should not be construed as being limited to the embodiments set forth herein. Rather, these disclosed embodiments are provided so that this disclosure is thorough and complete. In the drawings, the size and relative sizes may not be drawn to scale. Like reference numerals in the drawings are used throughout the disclosure to denote like elements.

There have been substantial efforts in the honeycomb extrusion field to increase feed rate of a plasticized batch composition through the extrusion die, as it is submitted that feed rate is tied, at least to some extent, to the cost of the final honeycomb body. Thus, feed rate increases equate with lower production costs of the final ceramic honeycomb body. However, for a number of reasons, such advancements have been elusive.

In the manufacture of ceramic honeycomb articles, a plasticized batch composition, which may be considered a non-ideal mixture, is extruded through an extruder comprising an extrusion die having an array of thin intersecting slots. The dry batch composition of inorganic ingredients (e.g., sources of alumina, silica, titania, and/or magnesia) are joined with an organic binder, a liquid vehicle (LV), possibly an oil lubricant, and optional pore former(s) and is plasticized by mixing and/or mulling to produce a plasticized batch. The plasticized batch is then fed to an extruder, such as a twin screw extruder. "Plasticized" as used herein means a property of a batch mixture that comprises an LV (e.g., de-ionized water) and possibly a lubricant and that has been mixed and/or mulled to have a paste consistency suitable for extrusion. "Batch composition" as used herein means a mixture of materials comprising at least inorganic raw materials, organic binder, optional pore former(s), and a LV. The plasticized batch composition may be configured as a pug of material that is intermittently fed to the extruder, or as a continuous or semi-continuous supply of plasticized batch composition that is mixed and/or mulled, and that is in a form and consistency that can be supplied continuously or semi-continuously to the extruder.

The plasticized batch composition may, under pressure from one or more extruder screws (e.g., a twin-screw extruder) or other suitable device, flow through the thin slots of the extrusion die of the extruder to form a green body, such as a wet green body honeycomb. The wet green honeycomb body may be dried by any suitable method, such as by using microwave drying, radio frequency (RF) drying, oven drying, or combinations thereof to form a dried green honeycomb body. After drying, the dried green body honeycomb is fired at high temperature in a kiln or furnace to produce a porous ceramic body, such as a porous ceramic honeycomb body.

It is a goal to extrude the plasticized batch at a feed rate that is as fast as practical, while also providing good quality wet green honeycomb bodies exhibiting low distortion, low tearing, and meeting a desired overall geometrical outer shape, as well as the desired shape of the intersecting walls and cells. Conventional batch composition formation involves mixing and/or mulling raw inorganic powders of various compositions, each of which having a rather broad particle size distribution, with an amount of organic binder (e.g., a cellulose-based binder), an oil lubricant, a LV, such as water, and an optional pore former. The sources of inorganic powders comprise, depending upon the ceramic composition that is sought to be formed, raw powdered materials comprising sources of alumina, silica, magnesia, titania, and/or the like, wherein each of these inorganic powders has its own particular particle size distribution. Moreover, the particles tend to be irregular in shape from processing (e.g., grinding or milling) or from their natural shape (e.g., plainness of clays) and also differ substantially in size. The batch compositions may comprise sintering aids, such as powdered sources of strontium, calcium, or other constituents in the conventional batch to promote sintering at lower temperatures. In such prior art conventional batch compositions, however, the feed rate of the plasticized batch that is achievable through the extrusion die has been limited by the properties of the batch composition.

For example, the batch stiffness and friction between the irregularly shaped and broad particle distribution batch materials with the metal wall surfaces of the thin intersecting die slots of the extrusion die may limit the achievable feed rate. To some extent, the batch stiffness may be adjusted by changing the relative amount of LV (e.g., water) in the plasticized batch, but shape control may suffer in such conventional batches when the LV %, s too high. As used herein water call is expressed as LV % SAT, wherein SAT means super-addition based upon a total weight of all inorganics in the batch composition.

For example, conventional prior art reactive batch compositions have been adjusted by a few LV % in water to adjust extrusion, while still retaining good shape properties of the wet extruded green body. Water percentages for conventional prior art reactive batch compositions have been up to about 25 LV % (See FIGS. 7 and 8) in the conventional reactive batch compositions. Water content in reactive batch compositions scales with the addition of starch level in the batch composition. Low porosity ceramic articles can be made with no or very low starch levels and may use only about 13% water, while the same batch composition with high starch levels may use up to about 25% water for the production of high porosity honeycombs. However, having too high of a water percentage in such conventional batch compositions can lead to certain problems in the wet green honeycomb bodies, such as slugging or slumping (loss of outer geometrical shape), and in some cases severe structural deformation, wall tearing or breakage, failure of material streams from slots to fully knit together, especially for thin walls due to the lack of suitable viscosity during and after extruding. Moreover, such dried green honeycomb bodies resulting from such batches may have excessive shrinkage during drying resulting in loss of desired overall geometrical shape. Such problems may be encountered in conventional batch compositions, when the LV % in the batch composition is above 25% by super-addition based on the total weight of the inorganic particles in the batch composition.

Furthermore, as the feed rate is increased, the temperature of the plasticized batch composition being extruded through the thin slots increases due to shear deformation. At low levels of shear, the extrusion pressure remains nearly constant. However, above a feed rate threshold, the batch can no longer handle the temperature increase, and thus stiffens and a significant increase in extrusion pressure may result. Such stiffening may lead to die breakage due to the extremely high pressures, or simply that extrusion is not possible above a threshold feed rate, i.e., the material will not extrude.

This behavior is due to the thermal phase transformation of the cellulose-based organic binder that is included in the plasticized batch composition. At higher temperatures, the cellulose molecules suffer water loss from their pendant methoxy groups and undergo a hydrophobic association between neighboring chains that results in phase separation and gel formation (gelation). N. Sakar, J. Appl. Polymer Science 24, 1073 (1979); "Thermal gelation properties of methyl- and hydroxypropyl methylcellulose." The stiffness of the plasticized batch composition increases with increasing gelation and consequently a strong increase in extrusion pressure is observed at the onset of gelation. The onset of gelation is characterized by a rather pronounced knee (change in slope) of the temperature versus pressure curve, and is characterized by the value $T^{onset}$. The temperature at which gelation occurs, i.e., $T^{onset}$, is one measure of how fast the batch will extrude.

The inventors have noted that certain conventional batch compositions, such as conventional aluminum titanate (AT) batch compositions, show a strong increase in pressure in their pressure-temperature curves around 35-40° C. $T^{onset}$ in such conventional AT batch depends on the methocel type and level, the LV % included in the plasticized batch, and the batch composition. Notably, it is desirable to utilize a relatively stiff batch (having a high Tau Y) because this may lead to better shape control of the wet green honeycomb body, i.e., less wall and/or cell distortion, less tearing, and less slumping (geometrical distortion as a result of the weight). The stiffness coefficient "Tau Y" is a measure of stiffness of the particular plasticized batch composition. Stiffer batches result in higher extrusion pressures and slower feed rates. Addition of liquid vehicle (e.g., water) to the conventional batch composition may allow for improved feed rate due to lower friction coefficients (Beta) between the batch and the thin die slots, but generally at the expense of shape control of the wet and dried green honeycomb body. The friction coefficient "Beta" is a measure of friction of the plasticized batch composition through a defined size slot.

Thus, in conventional batch compositions, there is a natural trade-off between desirable high batch stiffness (high Tau Y) and low wall friction (low Beta). Therefore, the ratio (Tau Y/Beta) between batch stiffness coefficient (Tau Y) and friction coefficient (Beta) may be used to characterize batch behavior during extrusion. High Tau Y/Beta ratio is desirable and is thought to enable higher extrusion rates. However, Tau Y/Beta ratios for conventional batches at desirable stiffness for extrusion are very low, i.e., in the range of between about 1.0 and 1.5.

So, improvements in batch compositions that lead to higher feed rates, while also retaining shape control and quality of the wet and dried green honeycomb, would be considered a major advancement in the honeycomb extrusion art.

Given the above limitations of conventional batches, one or more embodiments of the present disclosure provide a batch composition that may enable high extrusion rates, and in some cases, extrusion rates that are substantially greater than the best conventional feed rates, while also providing excellent shape control of the extruded body. For example, one or more batch compositions may enable dramatically increased feed rates during extrusion of wet green body honeycombs. Moreover, one or more of the batch compositions may provide a relatively-large process window based on the rheology of the batch composition. Such a relatively-large (widened) process window comprises a widened range in extrusion pressure, extrusion temperature, and extrusion rate.

One or more embodiments of the present disclosure comprise a batch composition that comprises a combination of relatively coarse, pre-reacted inorganic spheroidal particles having a controlled and narrow particle size distribution, a relatively small amount of fine inorganic particles (hereinafter "fines") in the batch inorganics, coupled with an extremely-high LV % in the batch composition. The fines in the batch composition are expressed as wt % SAP, wherein "SAP" means by super-addition to the total amount of the pre-reacted inorganic spheroidal particles in the batch composition. The liquid vehicle (LV) in the batch composition is added by wt % SAT, wherein SAT means by Super-Addition to the Total weight of the batch inorganics (weight of pre-reacted inorganic spheroidal particles plus "fines"). Additions of other components of the batch composition, such as the additions of organic binder, lubricant, and optional pore former, are all based upon wt % SAT.

The equations for each of SAP and SAT are as shown in Eqn. 1-5 as follows:

Fines in wt % SAP=(wt. of Fines/wt. of PISP)×100     Eqn. 1

LV % SAT=[wt. of LV/(wt. of PISP+wt. of fines)]×100     Eqn. 2

Organic Binder wt % SAT=[wt. of OB/(Wt. of PISP+wt. of fines]×100     Eqn. 3

Lubricant wt % SAT=(wt. of lubricant/Wt. of PISP+wt. of fines)×100     Eqn. 4

Pore Former wt % SAT=[wt. of PF/(Wt. of PISP+wt. of fines]×100     Eqn. 5 where:
PISP=pre-reacted inorganic spheroidal particles,
OB=organic binder, and
PF=pore former.

Applications of porous ceramic honeycomb bodies manufactured from the batch compositions described herein may comprise, for example, porous ceramic honeycomb bodies integrated into diesel catalyst supports, gasoline catalyst supports and/or diesel and gasoline particulate filters. In particular, the porous ceramic honeycombs may be used for automotive exhaust gas treatment comprising catalyzed substrates for carbon monoxide (CO) conversion, particulate filters for reducing diesel and gasoline particulate emission, and catalyst-coated particulate filters for selective catalytic reduction of nitrogen oxides (NOx). The resulting porous ceramic bodies may also be used for other filtering and/or catalyst support applications, such as porous filter membranes, $CO_2$ capture devices, chemical flow reactors, chemical absorbers, molten metal filters, regenerator cores, trough filters, candle filters, disc filters, radial-flow filters, and the like. One particularly useful example is a porous ceramic honeycomb article 100 that is embodied in the form of a particulate filter as shown in FIG. 1.

The porous ceramic honeycomb article 100 comprises a porous ceramic honeycomb body 101 comprising a matrix of intersecting walls 102 forming channels 104, 106 extending from a first end 108 to a second end 110. In the particulate filter embodiment shown, some of the channels 104, 106 may be plugged with plugs (e.g., plugs 112) as is known in the art. In other embodiments, no plugs may be provided and the porous ceramic honeycomb body 101 may be configured in a flow-through configuration and used as a catalyst support, for example.

Further details, features, and example embodiments of batch compositions, performance thereof, green bodies (such as wet and dried green honeycomb bodies) and porous ceramic bodies (such as porous ceramic honeycomb bodies) produced from the batch compositions, and methods of manufacturing green body honeycombs and porous ceramic articles from the batch compositions will now be described with reference to the various tables and FIGS. 1-14 provided herein, as are other aspects.

$D_{50}$

In the batch composition, the relatively coarse, pre-reacted inorganic spheroidal particles may have a particle size distribution wherein 20 µm≤$D_{50}$≤50 µm (comprising 20 µm, 25 µm, 30 µm, 35 µm, 40 µm, 45 µm, and 50 µm) wherein $D_{50}$ is defined herein as a median particle diameter of the particle size distribution. In some embodiments, the relatively coarse, pre-reacted inorganic spheroidal particles have a particle size distribution wherein the range of $D_{50}$ is even narrower, as will be explained further herein. For example, in some embodiments, the median particle diameter of the pre-reacted inorganic spheroidal particles may be 20 µm≤$D_{50}$≤45 µm, or even 25 µm≤$D_{50}$≤45 µm. The median particle diameter of the pre-reacted inorganic spheroidal particles may be adjusted by changing the solids loading and/or by changing processing parameters such as the spray drying pressure for fountain nozzle or the rotation rate of an atomizer nozzle of a spray dryer, the nozzle size, or the temperature settings of the spray dryer or the type and amount of added organic or polymeric binder when producing the green inorganic spheroidal particles, which are calcined or fired to produce the pre-reacted inorganic spheroidal particles.

$D_{90}$

Furthermore, the pre-reacted inorganic spheroidal particles may comprise a particle size distribution that comprises a large fraction of particles that are below a certain coarse diameter, such as $D_{90}$≤100 µm, $D_{90}$≤75 µm, or even $D_{90}$≤60 µm in some embodiments. $D_{90}$ is defined herein as a certain coarse particle diameter of a pre-reacted inorganic spheroidal particle within the particle size distribution, wherein 90% of the pre-reacted inorganic spheroidal particles in the distribution have a diameter that is equal to or less than the coarse diameter, i.e., the remaining particles (approx. 9.9999%) have a larger diameter.

$D_{10}$

Further yet, the pre-reacted inorganic spheroidal particles may comprise a particle size distribution that comprises a fine fraction of particles that are larger than a certain size, such as where $D_{10}$≥5 µm, $D_{10}$≥10 µm, $D_{10}$≥15 µm, $D_{10}$≥20 µm, or even $D_{10}$≥25 µm in some embodiments. $D_{10}$ is defined herein as a certain fine diameter of a particle within the particle size distribution, wherein 10% of the pre-reacted inorganic spheroidal particles in the particle size distribution have a particle diameter that is equal to or less than the fine diameter, i.e., the remaining (approx. 89.9999%) have a larger diameter.

Furthermore, in some embodiments, the pre-reacted inorganic spheroidal particles may comprise a relatively narrow particle size distribution being defined as having a combination of $D_{90}$≤75 µm and $D_{10}$≥5 µm, $D_{90}$≤65 µm and $D_{10}$≥5 µm, or even $D_{90}$≤70 µm and $D_{10}$≥10 µm.

dB

In some embodiments, the relatively coarse, pre-reacted inorganic spheroidal particles may comprise a particle size distribution that is relatively narrow in terms of its breadth. The relative narrowness of the particle size distribution of the pre-reacted inorganic spheroidal particles may be measured in terms of a breadth factor dB, wherein the breadth factor dB is defined by Eqn. 6 as:

$$dB=(D_{90}-D_{10})/D_{50} \qquad \text{Eqn. 6}$$

For example, the breadth factor dB of the particle size distribution according to embodiments may be defined by $dB \leq 2.00$, or even $dB \leq 1.00$, or even $dB \leq 0.90$, or even $dB \leq 0.80$ in some particularly narrow embodiments.

As should be recognized, the pre-reacted inorganic spheroidal particles have a particle size distribution that may be engineered and/or processed to meet the above pore size distribution parameters. Particle size as specified herein is measured by a Microtrac S3500 laser diffractometer.

In some embodiments, the narrowness of the relatively coarse pre-reacted inorganic spheroidal particles may be enhanced by certain processing adapted to remove some of the fine fractions of pre-reacted particles therein. For example, processing such as sieving, cyclonic separation, air classification, separation by setting or sedimentation, or the like may be used to remove some coarse and/or fine fractions from the particle size distribution. For example, a coarse portion in the particle size distribution with sizes larger than about 60 μm can be removed by passing the powder through a −270 mesh sieve (with approximately 53 micrometer mesh holes) and thus removing particles having a size smaller than 53 micrometers. Other sieve sizes can be used to remove other fractions from the large end of the particle size distribution. Fine fraction can also be removed by comprising a finer mesh sieve and discarding that which passes through the mesh.

Fines

Additionally, the batch composition comprises a small percentage of fine inorganic particles ("fines"). In particular, the batch composition comprises less than 20 wt % SAP of fine inorganic particles. The fine inorganic particles (fines) are relatively small particles wherein the particle distribution of "fines" added to the batch composition have a median particle diameter of less than 5 μm. "SAP" as used herein means by super-addition based upon a total weight of the pre-reacted inorganic spheroidal particles contained in the batch composition. In other embodiments, the batch composition comprises less than 15 wt % SAP of fine inorganic particles wherein the distribution of fines has a median particle diameter of less than 5 μm, less than 10 wt % SAP of fine inorganic particles wherein the distribution of fines has a median diameter of less than 5 μm, or even less than 7.5 wt % SAP of fine inorganic particles wherein the distribution of fines has median diameter of less than 5 μm in some embodiments.

In some embodiments, the "fines" in the batch composition consists essentially of a combination of fine alumina and fine silica. In further embodiments, both the fine alumina and the fine silica particles added to the batch composition each comprises a distribution that has a median particle diameter of less than 2 μm. In some embodiments, the batch composition comprises combinations of fine alumina and colloidal silica, wherein each comprises a particle distribution that has median particle diameter of less than 1 μm.

In some embodiments, the fine inorganic particles ("fines") in the batch composition may comprise a combination of alumina, talc, silica, and ceria particles wherein each has a median diameter of less than 5 μm.

In some embodiments, the batch composition may comprise fine titania comprising a particle distribution having a median particle diameter of less than 1 μm. In other embodiments, the fine inorganic particles in the batch composition may comprise a combination of alumina, talc, silica, and titania particles wherein each has a median diameter of less than 5 μm. The addition of titania particles can be used as a modulator to allow adjustment of the batch composition rheology behavior by adding various levels of Ti.

The fine inorganics in the batch composition function as an inorganic binder, binding together the pre-reacted inorganic spheroidal particles. Fine inorganic oxide powders have a large surface area per mass and interact strongly with batch LV (e.g., water) due to their relatively large surface area. Most of the oxides are hydrophilic, so that they tend to "bond" a lot of water, decreasing thereby the mobility of the batch water and inorganic particles. Thus, the result is to thicken the batch composition, and increase the friction in the batch. More internal batch friction means more friction to pass the batch composition through the extrusion die. More pressure to push the batch composition through the extrusion die contributes to low extrusion rate. Thus, the inventors have discovered that a low amount of fines in combination with the use of pre-reacted particles and high water call are desirable to achieve high extrusion rates.

In yet other embodiments, the batch composition comprises less than 15 wt % and greater than 3 wt % of fine inorganic particles wherein the distributions of the fine inorganic particles have a median particle diameter of less than 5 μm. In other embodiments, the batch composition comprises less than 10 wt % and greater than 3 wt % of fine inorganic particles wherein the distributions of the fine inorganic particles have a median particle diameter of less than 5 μm. In some embodiments, batch composition comprises less than 7.5 wt % and greater than 3 wt % of fine inorganic particles wherein the distributions of the fine inorganic particles have a median particle diameter of less than 5 μm. In other embodiments, the batch composition comprises less than 7 wt % and greater than 5 wt % of fine inorganic particles wherein the distributions of the fine inorganic particles have a median particle diameter of less than 5 μm.

In some embodiments, the fines in the batch composition comprise between about 1 wt % and 5 wt % alumina particles, 1 wt % to 7 wt % talc particles, and 0.5 wt % to 3 wt % silica particles. In some embodiments, the fine inorganic particles may comprise very fine alumina particles with a particle distribution having a median particle diameter of less than about 1 μm, or even less than 0.7 μm. In some embodiments, the fine inorganic particles may comprise fine talc particles with a particle distribution having a median particle diameter of less than about 5 μm. In some embodiments, the fine inorganic particles may comprise fine silica particles with a particle distribution a mean diameter of less than about 0.5 μm, or even less than 0.1 μm. The fine silica particles may be colloidal silica and may be provided as a suspension in water (e.g., a 40% suspension in water).

When alumina, talc and silica are used in combination as the inorganic binders, the composition is targeted to form cordierite and some glass phase in the areas between the pre-reacted inorganic spheroidal particles upon firing. To promote glass formation, low levels of glass formers can be added, such as ceria, yttria, calcia, other alkaline earth, rare earth, or alkali at levels of 1% SAP or less, comprising less than 0.5% SAP, less than 0.3% SAP, or even less.

When just alumina and talc are used in combination as the inorganic binders, the composition is targeted to form mullite, cordierite, and glass phase in the areas between the pre-reacted inorganic spheroidal particles upon firing.

When alumina, talc, silica, and titania are used in combination as the inorganic binders, the composition is targeted to form cordierite, aluminum titanate, and some glass phase in the areas between the pre-reacted inorganic spheroidal particles upon firing. However, as discovered by the inventors herein even small amounts of titania in the batch composition can produce a very viscous slip layer and dramatically lower Tau Y/Beta ratio to near that of conventional batches. So, as a matter of design for fast extrusion rates, the batch composition may be substantially devoid of titania. However, tinnier, as mentioned above, may be used in small amounts as a lever to control rheology of the batch composition.

In some embodiments, the batch composition comprises a ratio (RFP) of a total weight of the fine inorganic particles in the batch composition to a total weight of the pre-reacted inorganic spheroidal particles in the batch composition, wherein RFT (defined as a Ratio of Fines to Pre-reacted) is defined by Eqn. 7 below:

RFT=weight of the fines/weight of the PISP    Eqn. 7

In embodiments, the ratio RFP may be between 3:97 and 20:80.

Aspect Ratio

Figure 2:
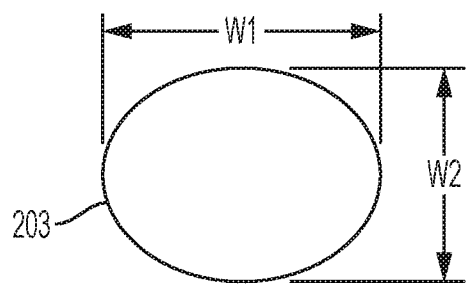
FIG. 2 illustrates a graphical diagram of a pre-reacted inorganic spheroidal particle (shown distorted for illustration purposes) used in batch compositions according to one or more embodiments.

In some embodiments, the pre-reacted inorganic spheroidal particles in the particle size distribution of the batch composition may have a shape, on average, that is spherical or near spherical and may comprise an Aspect Ratio (AR) of $AR \leq 1.2$ as is shown in FIG. 2, wherein AR is an average aspect ratio over all the pre-reacted inorganic spheroidal particles in the batch composition wherein an AR for each pre-reacted inorganic spheroidal particle is measured across a first width (W1) having a largest dimension divided by second width (W2) having a smallest dimension across the pre-reacted inorganic spheroidal particles 203. To achieve this $AR \leq 1.2$, the pre-reacted inorganic spheroidal particles 203 may be formed by a spray-drying process, as fully described in WO2016138192, for example. In some embodiments, the pre-reacted inorganic spheroidal particles 203 are rotary calcined at a suitable temperature to preserve the spheroidal shape.

Figure 3A:
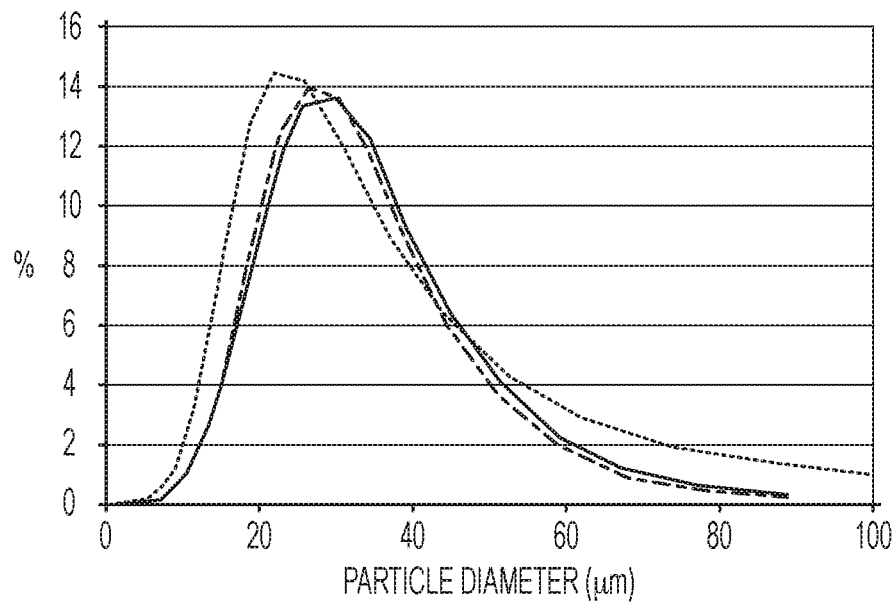
FIGS. 3A and 3B illustrate plots of particle size distribution of several embodiments of pre-reacted inorganic spheroidal particles used in batch compositions according to one or more embodiments.
Figure 3B:
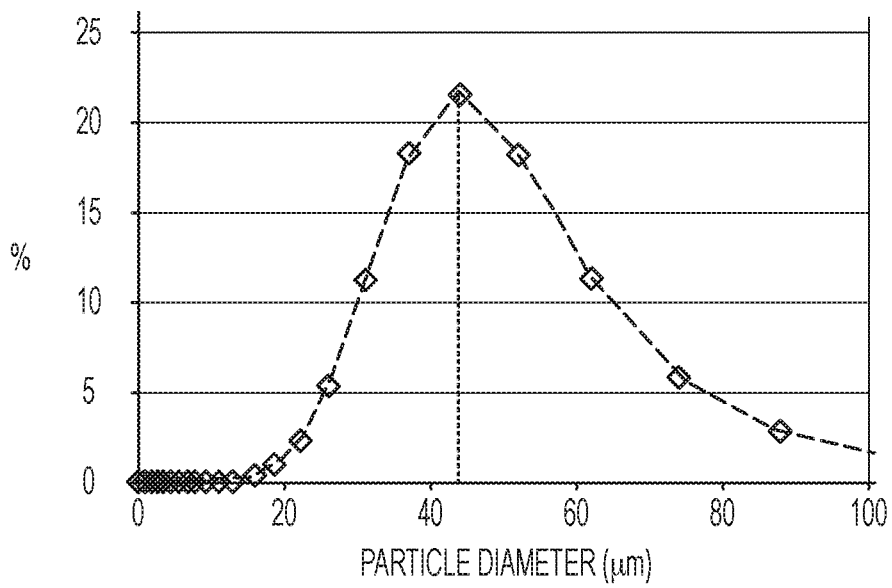

Examples of certain pre-reacted inorganic spheroidal particles 203 are shown in Table 1 below. FIGS. 3A and 3B illustrate plotted examples of representative particle size distributions of spray-dried and pre-reacted inorganic spheroidal particles

TABLE 1

Exemplary Pre-reacted Particle Size Distributions

| Batch # | SPD/Pre-reacted Composition | $D_{50}$ (μm) | $D_{90}$ (μm) | $D_{10}$ (μm) | $D_{95}$ (μm) | $D_5$ (μm) | dB |
|---|---|---|---|---|---|---|---|
| 1 | CMAT | 28 | 64 | 10 | 88 | 8 | 1.90 |
| 2 | CMAT | 28 | 64 | 10 | 88 | 8 | 1.90 |
| 3 | CMAT | 28 | 64 | 10 | 88 | 8 | 1.90 |
| 4 | CMAT | 28 | 64 | 10 | 88 | 8 | 1.90 |
| 5 | CMAT | 28 | 64 | 10 | 88 | 8 | 1.90 |
| 6 | CMAT | 28 | 64 | 10 | 88 | 8 | 1.90 |
| 7 | CMAT | 28 | 64 | 10 | 88 | 8 | 1.90 |
| 8 | CMAT | 28 | 64 | 10 | 88 | 8 | 1.90 |
| 9 | CMAT | 28 | 64 | 10 | 88 | 8 | 1.90 |
| 10 | CMAT | 28 | 64 | 10 | 88 | 8 | 1.90 |
| 11 | CMAT | 40 | 59 | 29 | 67 | 19 | 0.75 |
| 12 | CMAT | 28 | 64 | 10 | 88 | 8 | 1.90 |
| 13 | CMAT | 28 | 64 | 10 | 88 | 8 | 1.90 |
| 14 | CMAT | 28 | 64 | 10 | 88 | 8 | 1.90 |
| 15 | CMAT | 40 | 59 | 29 | 67 | 19 | 0.75 |

Examples of three representative particle size distributions of relatively coarse, pre-reacted inorganic spheroidal particles are shown in FIG. 3A. Further data on relatively coarse, pre-reacted inorganic spheroidal particles used in examples of batch compositions are shown in Table 1 above, such as $D_{50}$, $D_{90}$, $D_{10}$, $D_{95}$, $D_5$ and dB. In particular, FIG. 3A illustrates a relatively-narrow pre-reacted particle size distribution with a median particle diameter $D_{50}$ of about 20 μm to about 30 μm, and FIG. 3B illustrates a pre-reacted particle size distribution example having a relatively coarser distribution with $D_{50}$ of about 42 μm. Other values of $D_{50}$ may be obtained by being adjusted during formation of green inorganic particle spheroids by spray drying as discussed above. In addition, or optionally, sieving or other after-formation processing may be used to adjust the desired median particle diameter $D_{50}$ to be 20 $\mu m \geq D_{50} \geq 50$ μm. In the above examples, the phase composition of the pre-reacted inorganic spheroidal particles comprises cordierite, mullite, and aluminum titanate (CMAT) and comprises, as a major phase, a solid solution of aluminum titanate with magnesium dititanate, a second phase of cordierite, some mullite, and possibly also a glass phase. As will be apparent, however, other phase compositions of the pre-reacted inorganic spheroidal particles may be manufactured.

LV %

According to another aspect, the liquid vehicle percentage (LV %) in the batch composition is substantially above the amounts used in conventional batches, yet remarkably suitably high batch stiffness is retained. The liquid vehicle LV provides a medium for the organic binder to dissolve in, and thus provides plasticity to the batch composition and wetting of the inorganic particulates therein. The LV can be aqueous-based liquid, which is normally water or water-miscible solvents. In one implementation, the LV is deionized water, however other solvents such as alcohols can also be used. The liquid vehicle percentage LV % of the batch composition is LV %≥28% in some embodiments, or even LV %≥30%, LV %≥35%, or even LV %≥40%, or even LV %≥45% by weight super-addition (SAT) based on the total weight of inorganic particles that are present in the batch composition (e.g., pre-reacted inorganic spheroidal particles plus "fines"). In some embodiments, the LV % may comprise 28%≤LV %≤50% by weight super-addition (SAT). Remarkably, as was discovered by the inventors hereof, wet green honeycomb bodies 446W (FIG. 4A) formed from the batch compositions disclosed herein, even comprising such extremely-high liquid vehicle percentage (LV %≥28%), comprise very low wall drag as witnessed by low Beta, but remarkably also comprise very high batch stiffness as witnessed by relatively high Tau Y, such that excellent shape control is retained. In particular, high ratios of Tau Y/Beta are also achieved by the batch composition.

Pore Former

In some embodiments, one or more pore formers may be included in the batch composition. A pore former is a particulate organic material included in the batch composition that burns out during firing and produces open interconnected porosity in the fired ceramic article (e.g., in the porous ceramic honeycomb body). In particular, the pore former may comprise a single pore former material or a combination of pore former materials.

In some embodiments, the one or more pore formers may comprise a starch, graphite, or a polymer (e.g., polymer beads). In one particularly effective embodiment, the one or more pore formers comprise a starch, such as pea starch. In embodiments comprising only starch as the organic pore former, the starch may be provided in an amount of between about 5 wt % SAT and 30 wt % SAT. Other suitable starches that may be used in the batch composition as a pore former comprise potato starch, corn starch, sago starch, and bean starch. Starches can be standard starches, cross-linked starches, or highly cross-linked starches, for example.

In other embodiments, the batch composition comprises a combination of pore formers, such as a combination of starch and graphite as pore formers. For example, in some embodiments, the batch composition comprises a combination of pea starch as a pore former in an amount between 5 wt % and 30 wt % by SAT to all inorganic particles (pre-reacted inorganic spheroidal particles and "fines") in the batch composition, and graphite as a pore former in an amount between 1 wt % and 15 wt % by SAT to all the inorganic particles in the batch composition. The pea starch as a pore former may be a very highly cross linked (vhxl) pea starch as listed in Table 3 below. For example, a median particle size of the vhxl pea starch may be about $d_{50}$=26 um. The graphite listed in Table 3 may be platy graphite and may have plates with a median particle size of about 100 μm diameter and about 10 μm height, and comprises a very broad particle size distribution.

In other example embodiments, the batch composition comprises a spherical polymer pore former. The spherical polymer pore former may comprise a median particle diameter of between 15 μm and 40 μm, for example.

Organic Binder

The batch composition may comprise an organic binder. The organic binder may be, for example, a hydrophobically-modified cellulose ether binder. In some embodiments, the hydrophobically-modified cellulose ether binder may be, but not limited to, methylcellulose, ethylhydroxy ethylcellulose, hydroxybutyl methylcellulose, hydroxymethylcellulose, hydroxypropyl methylcellulose, hydroxyethyl methylcellulose, hydroxybutylcellulose, hydroxyethylcellulose, hydroxypropylcellulose, sodium carboxy methylcellulose, mixtures thereof, and the like. Methylcellulose and/or methylcellulose derivatives are especially suited as organic binders for use in the batch composition with methylcellulose and hydroxypropyl methylcellulose being used. Sources of cellulose ethers are METHOCEL™ cellulose products available from DOW® Chemical Co.

Some embodiments of the batch composition may comprise combinations of methylcellulose and hydroxypropyl methylcellulose. Other combinations of cellulose ether binders may comprise cellulose ethers having different molecular weights. Alternatively, the combination of cellulose ethers may comprise cellulose ethers having different hydrophobic groups, different concentrations of the same hydrophobic group, or other cellulose ether combinations. Different hydrophobic groups may be, by way of non-limiting example, hydroxyethyl or hydroxypropyl.

The organic binder may be provided in the batch composition in an amount of about 4.0 wt % SAT to % 8.0 wt % SAT. The organic binder, in some embodiments, may be a combination of a methylcellulose binder and a hydroxymethylcellulose binder, with between about 3.0 wt % SAT to % 6.0 wt % SAT of the methylcellulose binder, and between about 1.5 wt % SAT to 3.0 wt % SAT of the hydroxymethylcellulose binder. Some embodiments may comprise only hydroxymethylcellulose binder as the organic binder in an amount between about 4.0 wt % SAT to 8.0 wt % SAT, for example. In some embodiments, the liquid vehicle to organic binder ratio can be ≥6.4%.

Lubricants/Surfactants

The batch composition may further comprise a lubricant, such as an oil lubricant. Non-limiting examples of oil lubricants comprise tall oil, light mineral oil, corn oil, high molecular weight polybutenes, polyol esters, a blend of light mineral oil and wax emulsion, a blend of paraffin wax in corn oil, combinations of these, and the like. The amount of lubricant may be from about 0.5 wt % SAT to about 5 wt % SAT. In an exemplary embodiment, the oil lubricant may be tall oil present from about 0.5 wt % SAT to about 2.5 wt % SAT in the batch composition.

Further, the batch composition may optionally comprise a surfactant. Non-limiting examples of surfactants that can be used in the batch composition are $C_8$ to $C_{22}$ fatty acids and/or their derivatives. Additional surfactant components that can be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitoleic acids, and their derivatives, stearic acid in combination with ammonium lauryl sulfate, and combinations of all of these. The amount of surfactants typically may be from about 0.25 wt % SAT to about 2 Wt % SAT in the batch composition.

Pre-Reacted Particle Composition

The pre-reacted inorganic spheroidal particles are defined herein as spheroidal inorganic particles (e.g., formed by spray drying) that are at least partially reacted (e.g., by being fired or calcined) to comprise a desired ceramic crystalline phase composition prior to being provided to the batch composition. The pre-reacted inorganic spheroidal particles may be formed from mixtures of constituent materials that, upon firing, react to form oxide or non-oxide ceramics. In some embodiments, multiple crystalline phase compositions may be present in the calcined or fired particle. The pre-reacted organic spheroidal particles are formed to produce a desired spheroidal geometrical shape having a low aspect ratio AR as described herein.

Suitable processes for spray drying and calcining of green inorganic particles are disclosed in WO2016/138,192 entitled "Ceramic Composite Beads And Methods For Making The Same," and WO2014/189,817 entitled "Porous Ceramic Article And Method Of Manufacturing The Same." Other suitable spray-drying processes for manufacturing the pre-reacted organic particles may be used, such as the spray drying processes described in WO2014/189,740 and WO2014/189,741, for example. As will be apparent, green spheroidal particles may be produced by a spray-drying process and then calcined or fired to form the pre-reacted inorganic spheroidal particles.

By way of example, and not by limitation, the pre-reacted inorganic spheroidal particles may comprise one or more phase compositions. In many embodiments, at least a two-phase composition is provided, such as a primary phase and a secondary or minor phase. Optionally, the pre-reacted particles may comprise more than one secondary or minor phase.

In some embodiments, the pre-reacted inorganic spheroidal particles in the batch composition may comprise a predominant phase of aluminum titanate (e.g., >50% by volume). Other minor phases may be present.

In embodiments, the pre-reacted inorganic spheroidal particles in the batch composition may be formed to comprise any specific crystalline phase composition. In particular, the batch composition may comprise multi-phase crystalline phase compositions in some embodiments. For example, some embodiments may comprise pre-reacted inorganic spheroidal particles having a predominant crystalline phase of aluminum titanate and a minor glass phase.

For example, in one or more batch compositions, the pre-reacted inorganic spheroidal particles may comprise aluminum titanate-mullite pre-reacted inorganic spheroidal particles (hereinafter MAT), wherein the predominant crystalline phase is aluminum titanate and the second crystalline phase is mullite. Other minor phases may be present.

The batch composition comprising aluminum titanate-mullite pre-reacted inorganic spheroidal particles may be used to produce wet green bodies and porous ceramic bodies. For example, green body honeycombs may be formed from the batch composition comprising the aluminum titanate-mullite pre-reacted inorganic spheroidal particles and aluminum titanate-mullite porous ceramic honeycombs may be produced by firing them.

In other embodiments, the batch composition may comprise aluminum titanate-feldspar pre-reacted inorganic spheroidal particles and the batch composition may be used to produce green bodies and porous ceramic bodies. The pre-reacted inorganic spheroidal particles may comprise a predominant crystalline phase of aluminum titanate and a second crystalline phase of feldspar. For example, the aluminum titanate-feldspar porous ceramic bodies (e.g., aluminum titanate-feldspar porous ceramic honeycombs) may be produced. Other minor phases may be present.

In yet other embodiments, the batch composition may comprise cordierite, mullite, aluminum titanate (hereinafter CMAT) pre-reacted inorganic spheroidal particles and the batch composition may be used to produce green bodies and porous ceramic bodies. CMAT is a solid solution of a first crystalline phase predominantly of aluminum titanate and magnesium dititanate, with secondary crystalline phase comprising cordierite. A third crystalline phase of mullite. A glass phase may also be present. According to some embodiments, the pre-reacted inorganic spheroidal particles in the batch composition comprise, in weight % on an oxide basis, from 4% to 10% MgO; from 40% to 55% $Al_2O_3$; from 25% to 44% $TiO_2$, and from 5 to 25% $SiO_2$. CMAT porous ceramic bodies (e.g., CMAT porous ceramic honeycombs) may be produced from the batch composition.

In other embodiments, the batch compositions comprise cordierite pre-reacted particles and the batch compositions may be used to produce green bodies and cordierite ceramic bodies. For example, cordierite porous ceramic bodies (e.g., honeycomb green bodies and cordierite ceramic honeycombs) may be produced. One composition of pre-reacted inorganic spheroidal particles, by way of a non-limiting example, which ultimately forms cordierite upon firing is, in percent by weight, about 33-41% of aluminum oxide, about 46-53% of silica, and about 11-17% of magnesium oxide.

The above pre-reacted inorganic spheroidal particles are exemplary. The composition of the pre-reacted inorganic spheroidal particles may optionally comprise other ceramic-forming compositions and phase combinations. For example, pre-reacted inorganic spheroidal particles may optionally have compositions comprising feldspar, mullite, alumina, alumino-silicate, solid solution of aluminum titanate and magnesium dititanate (pseudobrookite), spinel, rutile, cristobalite, zircon, alkali alumino-silicate, alkaline-earth alumino-silicate, perovskite, zirconia, ceria, silicon oxide ($SiO_2$), silicon nitride ($Si_3N_4$), silicon carbide, cerium titanate, silicon aluminum oxynitride (SiAlON), CaO, SrO, $CeO_2$, $Y_2O_3$, $La_2O_3$, other rare earth oxides, and zeolites.

Various example embodiments comprising various combinations of the pre-reacted inorganic spheroidal particles and fines in batch compositions are shown in Table 2 below.

TABLE 2

Example Batch Compositions Comprising Pre-Reacted Inorganic Spheroidal Particles

| | Pre-reacted Inorganics | | | Fines in inorganics (wt % SAP) | | | | |
|---|---|---|---|---|---|---|---|---|
| Batch # | Comp. | % | Median Particle Size (μm) | Fine alumina (wt % SAP) | Fine Talc (wt % SAP) | Ludox contains 40% $SiO_2$ (wt % SAP) | Titania (wt % SAP) | Total Fines (wt % SAP) |
| 1 | CMAT | 100 | 28 | 2.00 | 3.00 | 1.78 | 0.00 | 6.78 |
| 2 | CMAT | 100 | 28 | 2.00 | 3.00 | 1.92 | 0.00 | 6.92 |
| 3 | CMAT | 100 | 28 | 2.00 | 3.00 | 0.96 | 0.00 | 5.95 |
| 4 | CMAT | 100 | 28 | 2.00 | 3.00 | 1.92 | 0.00 | 6.91 |
| 5 | CMAT | 100 | 28 | 2.00 | 3.00 | 1.91 | 0.00 | 6.91 |
| 6 | CMAT | 100 | 28 | 2.00 | 3.00 | 1.92 | 0.00 | 6.91 |
| 7 | CMAT | 100 | 28 | 2.10 | 3.20 | 1.60 | 0.00 | 6.91 |
| 8 | CMAT | 100 | 28 | 1.59 | 3.17 | 0.66 | 1.06 | 6.48 |
| 9 | CMAT | 100 | 28 | 4.44 | 6.67 | 2.67 | 0.00 | 13.78 |
| 10 | CMAT | 100 | 28 | 1.03 | 1.54 | 0.64 | 0.00 | 3.20 |
| 11 | CMAT | 100 | 40 | 2.11 | 3.16 | 1.33 | 0.00 | 6.59 |
| 12 | CMAT | 100 | 28 | 2.00 | 3.00 | 1.92 | 0.00 | 6.92 |
| 13 | CMAT | 100 | 28 | 2.00 | 3.00 | 1.91 | 0.00 | 6.91 |
| 14 | CMAT | 100 | 28 | 2.00 | 3.05 | 0.00 | 0.00 | 5.04 |
| 15 | CMAT | 100 | 28 | 2.00 | 3.05 | 0.00 | 0.00 | 5.04 |
| 16 | CMAT | 100 | 28 | 2.00 | 3.05 | 0.00 | 0.00 | 5.04 |
| 17 | CMAT | 100 | 40 | 2.11 | 3.16 | 0.00 | 0.00 | 5.26 |

Various embodiments illustrating combinations of pore formers, organic binders, lubricants, and LV % in the batch compositions are shown in Table 3 below wherein the wt % SAT of the batch additions of pore formers, organic binders, lubricant, and LV % are listed.

TABLE 3

Example Batch Compositions Additives

| Pore Formers | | Organic Binder | | | | |
|---|---|---|---|---|---|---|
| vhxl pea starch (wt % SAT) | Graphite (wt % SAT) | Methyl-cellulose (wt % SAT) | F240 (wt % SAT) | Lubricant (Tall Oil) (wt % SAT) | LV % (wt % SAT) | LOD % |
| 8.14 | 4.07 | 4.27 | 2.14 | 1.07 | 35 | 22.5 |
| 14.25 | 7.13 | 4.28 | 2.14 | 1.07 | 45 | 30.0 |
| 14.12 | 7.07 | 4.24 | 2.12 | 2.12 | 44 | 28.9 |
| 14.25 | 7.13 | 5.35 | 2.67 | 1.07 | 48 | 32.4 |
| 14.25 | 7.13 | 3.21 | 1.60 | 1.07 | 44 | 29.4 |
| 14.25 | 7.13 | 3.21 | 1.60 | 2.14 | 43 | 28.5 |
| 8.55 | 4.28 | 4.28 | 2.14 | 1.07 | 40 | 27.7 |
| 14.91 | 7.45 | 4.26 | 2.13 | 1.06 | 47 | 30.2 |
| 15.93 | 7.96 | 4.55 | 2.28 | 1.14 | 44 | 29.6 |
| 14.45 | 7.22 | 4.13 | 2.06 | 1.03 | 47 | 29.9 |
| 14.92 | 7.46 | 4.26 | 2.13 | 1.07 | 44 | 28.9 |
| 14.25 | 7.13 | 4.28 | 2.14 | 1.07 | 44 | 29.1 |
| 14.25 | 7.13 | 3.21 | 1.60 | 1.07 | 44 | 28.3 |
| 5.04 | 2.00 | 0.00 | 6.30 | 1.05 | 30 | NA |
| 5.04 | 2.00 | 0.00 | 6.30 | 1.05 | 35 | NA |
| 5.04 | 2.00 | 0.00 | 6.30 | 1.05 | 37 | NA |
| 16.00 | 8.42 | 0.00 | 6.32 | 1.05 | 32 | NA |

Batch Rheology

As discussed above, green bodies (e.g., wet honeycomb green bodies) may be formed by extrusion with well-defined walls, well-formed cell structures, and well-defined outer shape using the batch compositions described herein. Moreover, as will be recognized, such batch compositions may comprise very high ratios of Tau Y/Beta (e.g., Tau Y/Beta≥2.0, Tau Y/Beta≥3.0, Tau Y/Beta≥4.0 or more) and may also exhibit increased $T^{onset} \geq 47°$, $T^{onset} \geq 50°$ C., or even $T^{onset} \geq 55°$ C. in some embodiments. Pressure versus temperature curves are characterized by a flat portion at low temperature before the pressure increases at higher temperatures. The onset temperature $T^{onset}$ is defined as when the pressure reaches 1.15 times the average pressure of the constant plateau pressure, as defined over a window of 15 degrees.

As such, significantly higher extrusion feed rates can be enabled when extruding the batch composition from an extrusion die 444 (FIG. 4A) as compared to conventional batch compositions. This may contribute to lower cost for the manufacture of green bodies (e.g., wet green honeycomb bodies) and therefore may also reduce a cost of the final porous ceramic honeycomb bodies produced therefrom.

Determination of Tau Y and Beta

Homogeneous ceramic batch compositions comprising pastes were made from the mixture of batch inorganics (pre-reacted, inorganic spheroidal particles, and "fines"), pore former particles, organic binders, LV (e.g., deionized water), and optional lubricants by high-shear mixing the various ingredients in a Brabender mixer (commercial Brabender Plastograph EC 3.8 kW, 200 NM/150 min equipped with mixer type 359). In some embodiments, a stiffness of the paste was measured with a penetrometer to ensure the proper paste consistency. A commercial penetrometer ESM-301E motorized test stand with digital force gauge was used.

Figure 9:
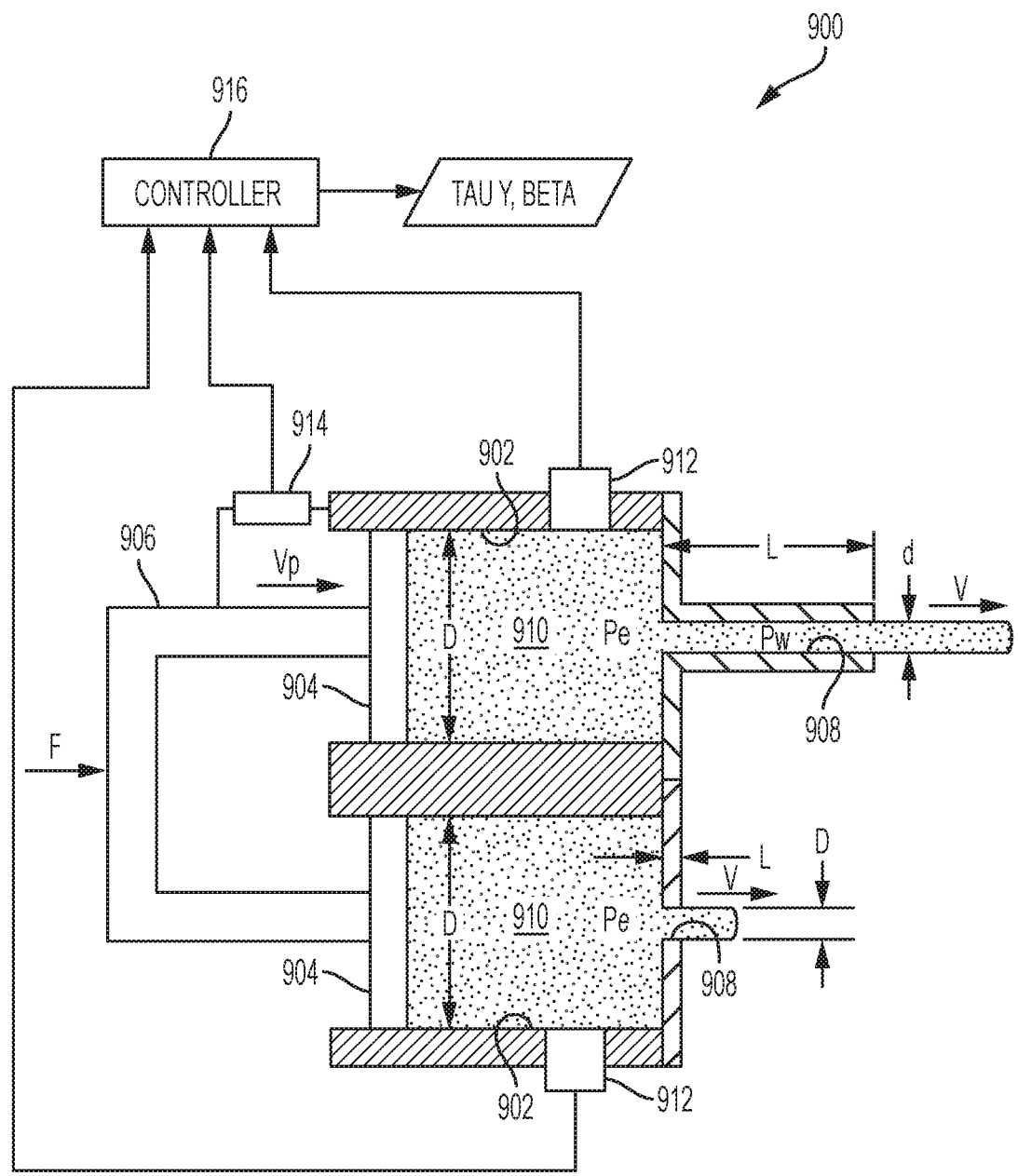
FIG. 9 illustrates a cross-sectioned side view of a capillary rheometer configured to test rheological properties of the batch compositions according to embodiments.

Paste flow characteristics of the batch composition are measured using a commercial dual-bore capillary rheometer (hereinafter "capillary rheometer") with instrumented pistons and multiple capillary lengths. Both batch stiffness and wall drag may be simultaneously measured on the capillary rheometer. An example of the capillary rheometer 900 is shown in FIG. 9.

The capillary rheometer 900 used comprises multiple cylindrical-shaped barrels 902 having a diameter D of 16 mm and several capillaries 908 of different length L with a small circular bore hole having a capillary diameter d of 1 mm. Capillary lengths L ranged from 0 mm to 16 mm, and in particular 0 mm (actually for practicality 0.25 mm), 4 mm, 10 mm, and 16 mm. Disc-shaped pistons 904 were mounted for translational motion in the barrels 902 when a force F is exerted on the pistons 904 such as by exerting a force F on a cross member 906 interconnected to each of the pistons 904. After being mixed as discussed above, the batch composition 910 comprising a paste is inserted in, and is extruded from, the barrels 902 of the capillary rheometer 900 into and through the capillaries 908 under various levels of force F thus producing the different velocities V. A representative pressure drop Ptotal across the capillary rheometer 900 is determined by measuring pressure Ptotal and velocity Vp supplied to the pistons 904 that contact and cause extrusion of the batch composition 910 through the capillaries 908. The total pressure Ptotal for each die (e.g., long and zero length dies are shown) is determined from pressure sensors 912 that measure the pressure Ptotal exerted on the batch compositions 910 contained in the barrels 902.

The velocity V of the batch compositions 910 in the capillaries 908 is related to the piston velocity Vp by representative ratios of the areas by the Eqn. 8 below:

$$V = Vp(D^2/d^2) \qquad \text{Eqn. 8}$$

The piston velocity Vp may be measured by a suitable displacement sensor 914 coupled between (i) the pistons 904 or cross member 906 and (ii) either ground or the extruder body comprising the barrels 902. The total pressures Ptotal and piston velocity Vp may be provided to a suitable controller 916 comprising a suitable processor and memory configured sufficiently to carry out the calculations to be able to produce, as an output, Tau Y and Beta values of the batch composition.

Representative raw data from an exemplary capillary rate sweep test illustrating four capillaries 908 of different length L (L of 16 mm, 10 mm, 4 mm, and 0.25 mm) and capillary diameter d of 1 mm for different extrusion rates are shown in Table 4 below. Push rate of the piston 904 ("plunger") and extrusion rate coming out of the capillary ("noodle") as well as the total pressure Ptotal are provided for each length L.

TABLE 4

Velocities (V and Vp) versus total pressure (Ptotal) for various capillary lengths (0.25 mm to 16 mm) during batch composition extrusion.

| | | capillary length × diameter | | | |
|---|---|---|---|---|---|
| Plunger mm/min. | Noodle in/s | 16 × 1 Pressure psi | 10 × 1 Pressure psi | 4 × 1 Pressure psi | 0.25 × 1 Pressure psi |
| 27.09 | 4.000 | 1050.65 | 887.935 | 668.68 | 532.065 |
| 20.34 | 3.000 | 1022.885 | 859.665 | 641.165 | 506.98 |
| 13.55 | 2.000 | 990.445 | 825.89 | 610.52 | 478.39 |
| 10.16 | 1.500 | 969.825 | 806.985 | 592.005 | 460.7 |
| 6.77 | 1.000 | 943.895 | 781.86 | 565.715 | 437.86 |
| 5.08 | 0.750 | 924.095 | 768.915 | 549.07 | 422.345 |
| 3.39 | 0.500 | 899.15 | 753.52 | 526.07 | 401.455 |
| 1.69 | 0.250 | 853.695 | 736.04 | 486.38 | 366.23 |
| 0.68 | 0.100 | 767.51 | 692.805 | 426.565 | 321.725 |
| 0.05 | 0.007 | 479.09 | 522.195 | 275.49 | 226.915 |

When the shortest capillary 908 having a length L of 0.25 mm long (or approx. 0 mm long) is used for extrusion, then the batch composition 910 has to adapt its shape from the relatively-large diameter D of the barrel 902 (16 mm) to a relatively-small diameter d of the capillary 908 (1 mm). The pressure drop Ptotal across this capillary 908 ("approx. zero capillary") corresponds to batch stiffness via the pressure required for the geometrical contraction of the batch composition from the 16 mm barrel to the 1 mm capillary 908. Use of the "approx. zero capillary" may be indicative of, and may be used to determine, entry loss components, as its short length (approx. L=0) minimizes wall drag component so that it can effectively be ignored. Use of a longer capillary (for example, the 16 mm long capillary) produces both a wall drag component due to friction/drag along the length L of the wall of the capillary 908 and stiffening of the batch composition due to the change in its shape, i.e. entry loss component. Thus, the measured pressure drop Ptotal as a function of velocity V may contain both an entry loss component Pe and a wall drag component Pw, which are separable as will be apparent.

The batch compositions were tested with capillary rate sweep tests for the different length capillaries of capillary length L (0 mm to 16 mm) at 10 different velocities V (effectively velocity (V) from 0 mm/sec to 4 in/sec (101.6 mm/sec)) and at a constant temperature of about 25° C. The extrusion velocity V (noodle) through the capillary 908 was stepped up to successively higher velocities V, and the representative total pressure drop (Ptotal) was recorded for each step via sensors 912 when a steady state velocity V was reached. This raw Ptotal and velocity V data for each length L of capillary 908 were provided to controller 916, stored in memory and further calculations as described herein are undertaken to calculate Tau Y and Beta for each measured batch composition. Example values are shown in Table 5 below for one batch composition.

TABLE 5

L/d, Noodle Velocity V, Tw, Pe, Pe-avg, and Pe-intercept
Noodle Velocity (in/sec)

| L/d | 4.00 | 3.00 | 2.00 | 1.50 | 1.00 | 0.75 | 0.50 | 0.26 | 0.10 | 0.007 |
|---|---|---|---|---|---|---|---|---|---|---|
| 16 | 1051 | 1023 | 990 | 970 | 944 | 924 | 899 | 854 | 768 | 479 |
| 10 | 888 | 860 | 826 | 807 | 782 | 769 | 754 | 736 | 693 | 522 |
| 4 | 669 | 641 | 611 | 592 | 566 | 549 | 526 | 486 | 427 | 275 |
| 0.25 | 532 | 507 | 478 | 461 | 438 | 422 | 401 | 366 | 322 | 227 |
| Tw | | 8.30 | 8.26 | 8.19 | 8.15 | 8.12 | 8.07 | 8.05 | 8.00 | 7.49 | 4.67 |
| Pe | | 520 | 494 | 466 | 448 | 424 | 408 | 384 | 342 | 288 | 181 |
| Pe | | 556 | 529 | 498 | 481 | 457 | 446 | 432 | 416 | 393 | 336 |
| Pe | | 536 | 509 | 479 | 462 | 436 | 420 | 397 | 358 | 307 | 201 |
| Pe | | 524 | 499 | 470 | 453 | 430 | 414 | 393 | 358 | 314 | 222 |
| Pe - avg | | 534 | 508 | 478 | 461 | 437 | 422 | 402 | 369 | 326 | 235 |
| Pe - intercept | | 534 | 508 | 478 | 461 | 437 | 422 | 402 | 369 | 326 | 235 |

Figure 10:
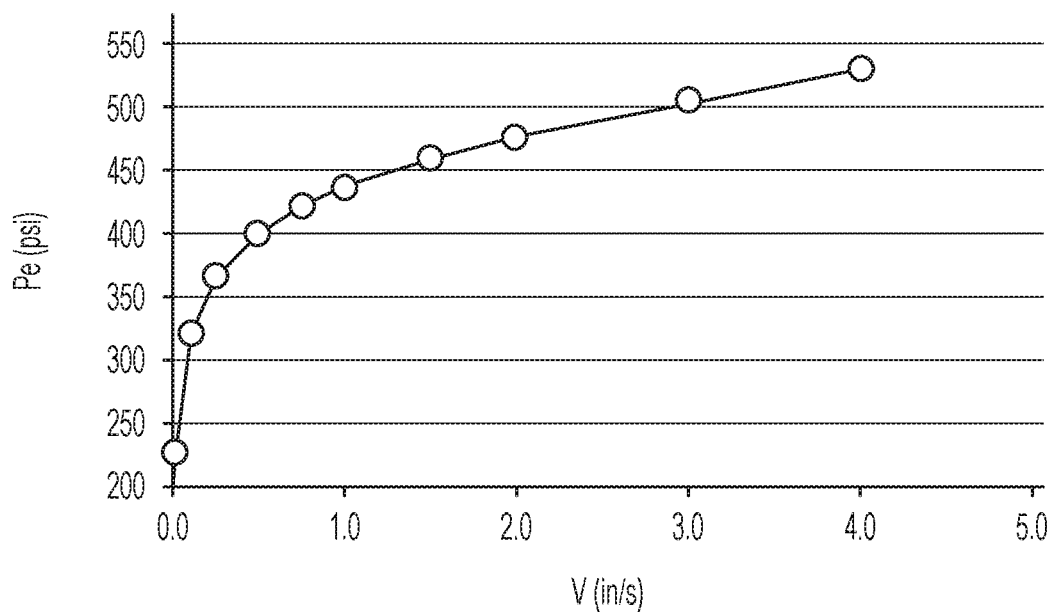
FIG. 10 illustrates a plot of entry pressure Pe (psi) versus Velocity (in/s) of an example embodiment of a batch composition comprising pre-reacted inorganic spheroidal particles.

As shown in FIG. 10, a plot of entry pressure Pe (psi) versus velocity V (in/s) illustrates the nonlinearity of the entry pressure loss as a function of velocity V provided by the zero length (0.25 in) capillary 908.

Figure 11:
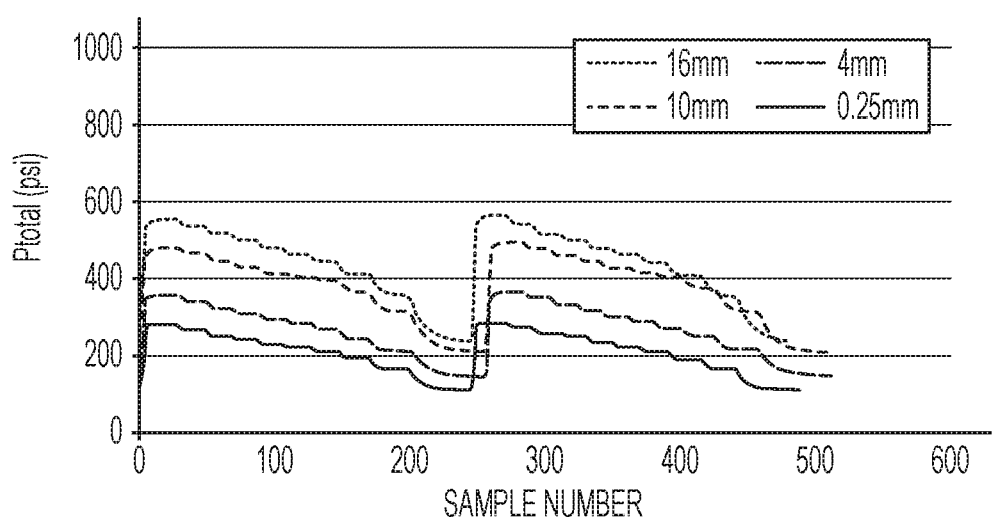
FIG. 11 illustrates a plot of Ptotal (psi) versus Sample Number of an example embodiment of a batch composition comprising pre-reacted inorganic spheroidal particles at multiple velocities V and for different capillary lengths L.
Figure 12:
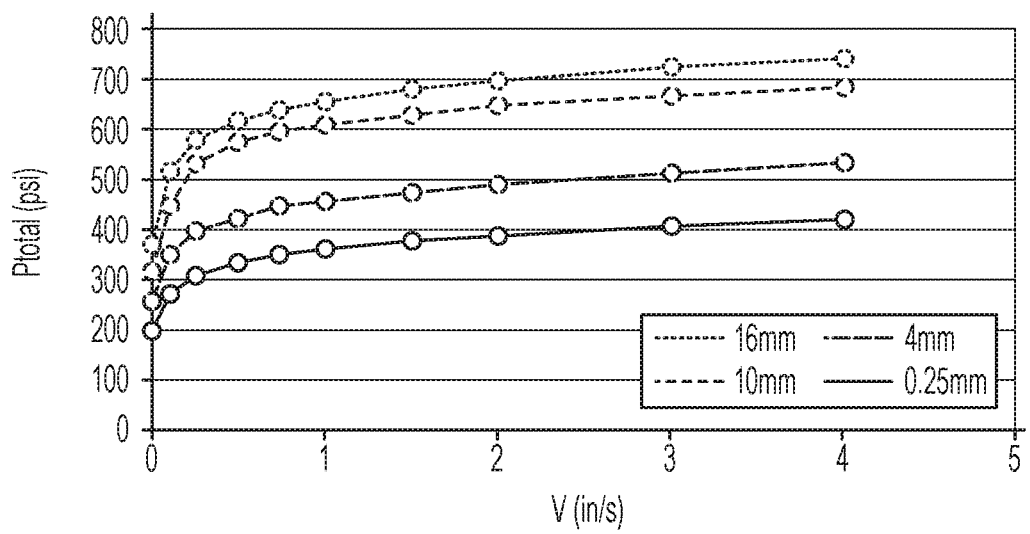
FIG. 12 illustrates a plot of Ptotal (psi) versus V (in/s) of an example embodiment of a batch composition comprising pre-reacted inorganic spheroidal particles extruded through different capillary lengths L of a capillary rheometer.

Representative examples of raw data output from a capillary rate sweep test with the four different sized capillaries (0.25 mm to 16 mm) and ten velocities is shown in FIG. 11 illustrating test values for a batch composition comprising pre-reacted inorganic spheroidal particles at multiple steps and multiple curves, each corresponding to one capillary length (with larger L values illustrating higher pressures). The sweep test is repeated twice in the depicted example. The raw data may be converted into pressure vs. velocity plots by using any suitable software program. Example pressure versus velocity plots are shown in FIG. 12 for spray-dried pre-reacted CMAT batch compositions.

As discussed above, the total measured pressure drop Ptotal is equal to the entry pressure Pe plus the wall drag contribution Pw and can be represented by the relationship:

$$Ptotal = Pe + Pw$$

Numerous models have been developed that relate the pressure drop of the batch composition 910 in the capillary rheometer 900 across the geometrical contraction from D to d and through the capillary 908 to the batch rheology. Capillary characteristics comprise the capillary diameter d, capillary length L, and constants that comprise aspects related to the capillary material and the capillary surface roughness, but that do not change for a given capillary 908 of given length L and diameter d. The testing methods described herein are used to determine batch rheological characteristics comprising Tau Y (yield stress) and the Beta (wall drag coefficient) which are unique parameters that define rheological properties of the various batch compositions described herein.

The Benbow-Bridgwater model is used to describe wall drag Pw as a function of capillary length L, capillary diameter d, velocity V, wall drag coefficient β (Beta), and wall velocity exponent m [See references: J. Benbow, J. Bridgwater, Paste flow and extrusion, Oxford University Press, 1993 and J. J. Benbow, E. W. Oxley, J. Bridgwater "The extrusion mechanics of pastes—the influence of paste formulation on extrusion parameters"; Chemical Eng. Science 53, 2151 (1987)]. The model characterizes wall drag Pw as Eqn. 9 below:

$$Pw = \{4L/d\}[\beta V^m] \qquad \text{Eqn. 9}$$

where:

L is the capillary length
d is the capillary diameter
β (Beta) is the wall drag coefficient
m is the wall velocity exponent
V is the paste velocity at the wall But the shear stress at the wall Tw is as shown in Eqn. 10 below:

$$Tw = \beta V^m \qquad \text{Eqn. 10}$$

Thus the wall drag pressure component can be expressed as Eqn. 11 below:

$$Pw = (4L/d)Tw \qquad \text{Eqn. 11}$$

The natural log of shear stress (Ln (Tw)) is plotted against the natural log of velocity (Ln(V)). From this plotted data, the term β can be extracted as the y-intercept of the Ln(Tw) and Ln(V) plot, and m is the slope of that line. The slope m is determined over the length data from 0 in/s to 4 in/s. Outliers are ignored, and the test should be run multiple times and the results averages for each batch composition.

The entry pressure Pe can be approximated by Eqn. 12 below:

$$Pe = 2\{TauY + kV^m\}\{Ln(D/d)\} \quad \text{Eqn. 12}$$

Given that Ptotal=Pe+Pw, then the model defines the total pressure P as shown in Eqn. 13 below:

$$Ptotal = 2\{TauY + kV^m\}\{Ln(D/d)\} + \{4L/d\}[\beta V^m] \quad \text{Eqn. 13}$$

where:
Tau Y is the yield stress of the batch composition
k is a consistency Index
n is the bulk velocity exponent
D is the extruder barrel diameter
d is the capillary diameter
L is the capillary length
β (Beta) is the wall drag coefficient
m is the wall velocity exponent
V is the paste velocity at the wall The values of Tau Y, k, and n can be extracted from the measured data through a three-parameter curve fit through the use of a solver, such as the solver provided in MS Excel or any other iterative solver, in order to minimize the difference between the measured and calculated parameters. The values of Tau Y and β (Beta) are parameters used herein to characterize the extrusion rheological properties of the batch compositions described herein and are calculated as described above. From this measured raw data, controller 916 calculates both Tau Y and Beta.

Figure 7:
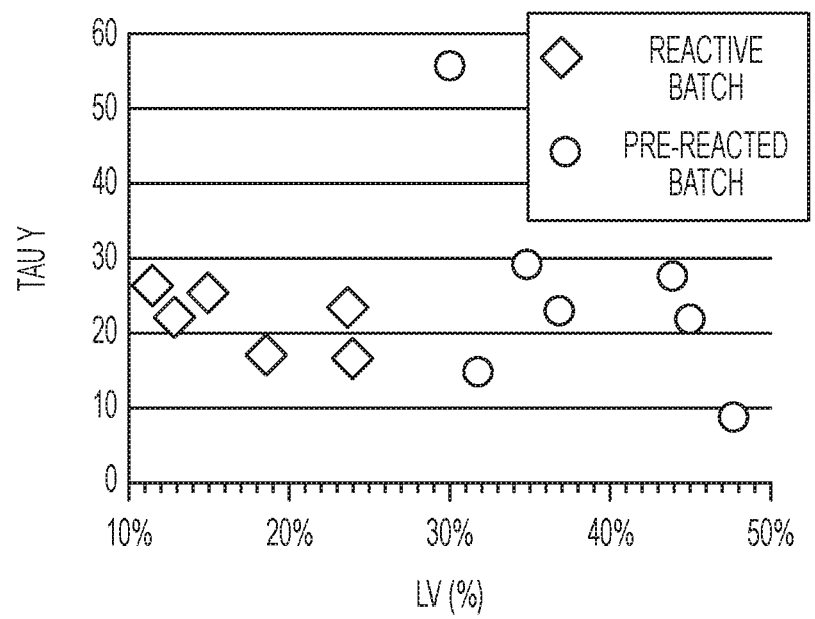
FIG. 7 illustrates a plot of LV % (water content in wt %) versus batch stiffness Tau Y of conventional batch compositions in comparison to LV % versus batch stiffness Tau Y for various embodiments of the batch composition comprising pre-reacted inorganic spheroidal particles according to one or more embodiments.

In more detail, FIG. 7 illustrates a plot showing a comparison between LV % (liquid vehicle content wt % SAT) of conventional batch compositions in comparison to LV % used in various embodiments of the batch composition comprising pre-reacted inorganic spheroidal particles. As should be noted, in many cases, comparable batch stiffness Tau Y may be achieved even with much higher LV %. For example, comparable Tau Y can be achieved with as much as twice the LV % or more, while also achieving good batch stiffness.

Figure 8:
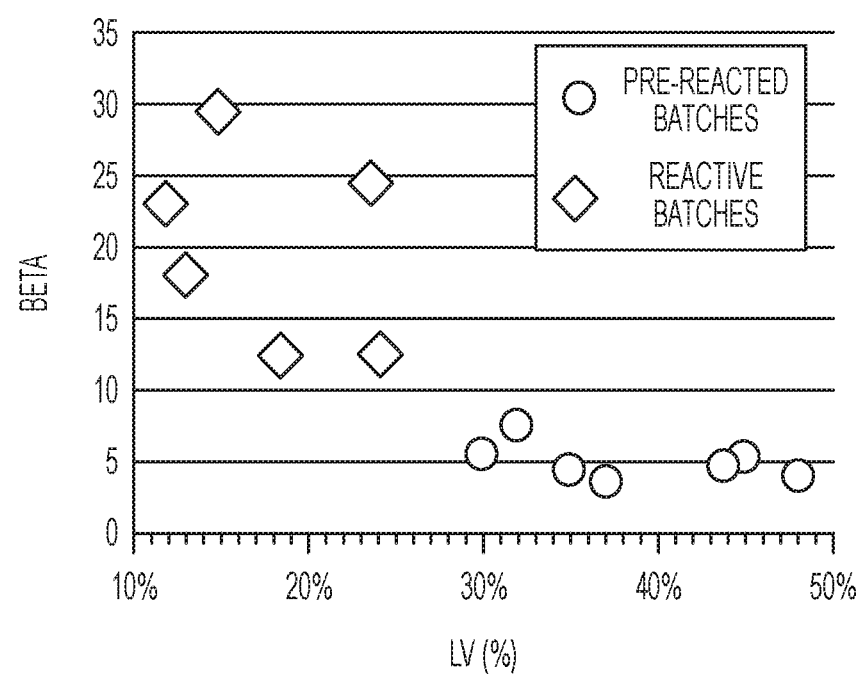
FIG. 8 illustrates a plot of LV % (water content in wt %) versus batch friction Beta of conventional batch compositions in comparison to LV % versus batch friction Beta for various embodiments of the batch composition comprising pre-reacted inorganic spheroidal particles according to one or more embodiments.

FIG. 8 illustrates a plot of LV % (water content in wt % SAT) versus the batch friction, Beta (β), of conventional batch compositions in comparison to LV % versus batch friction, Beta, for various embodiments of the batch composition comprising pre-reacted inorganic spheroidal particles according to embodiments. As is demonstrated by the plot in FIG. 8, much lower Beta is achieved when using the batch compositions comprising the pre-reacted inorganic spheroidal particles, small amount of "fines", and LV %≥28%. As can be seen in FIG. 8 and in Table 6 below, a relatively low Beta (friction coefficient) can be achieved with the batch composition, such as Beta≤10, Beta≤7, Beta≤6, Beta≤5, Beta≤4, and even Beta≤3 in accordance with embodiments of the batch compositions described herein.

Figure 13:
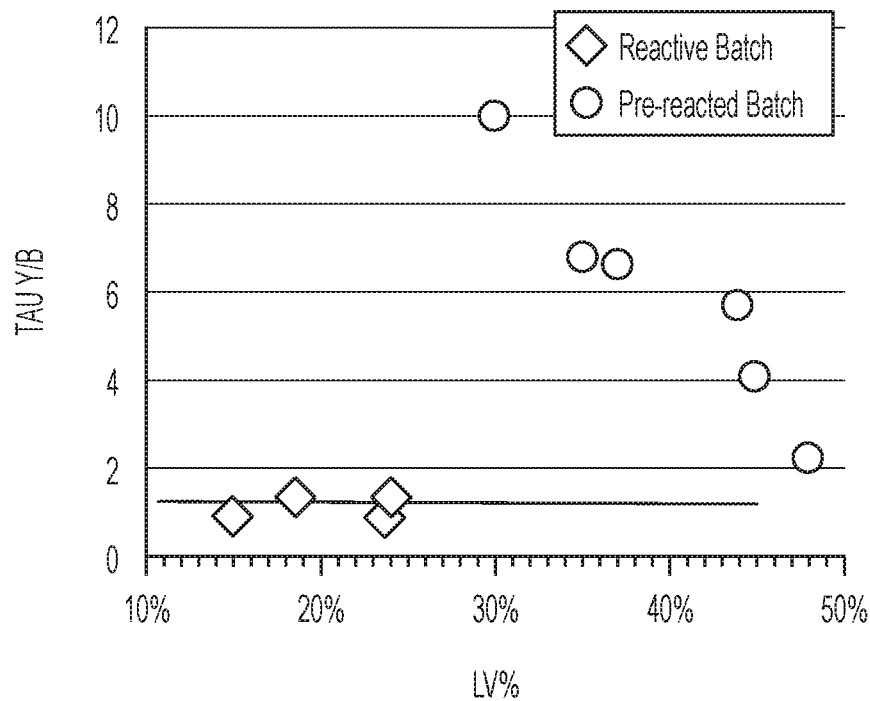
FIG. 13 illustrates a plot of LV % (water content in wt %) versus Tau Y/Beta of reactive batch compositions in comparison to LV % versus Tau Y/Beta for various embodiments of the batch composition comprising pre-reacted inorganic spheroidal particles.
Figure 14:
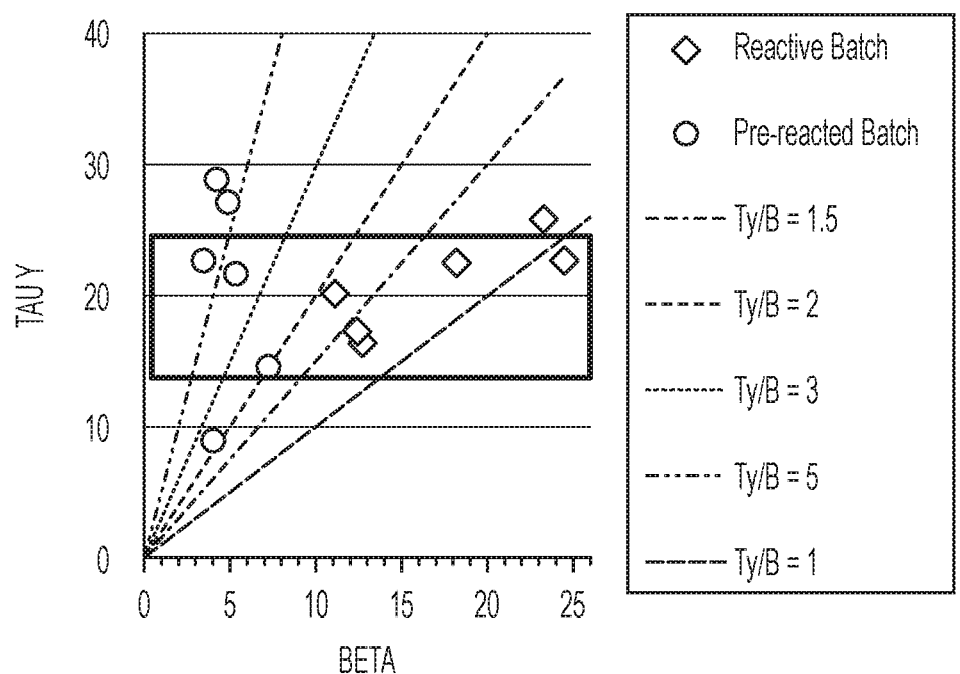
FIG. 14 illustrates a plot of Tau Y versus Beta for reactive batch compositions and for various embodiments of the batch composition comprising pre-reacted inorganic spheroidal particles.

FIG. 13 illustrates a plot of LV % (water content in wt % SAT) versus the ratio of Tau Y divided by Beta (β) for conventional batch compositions and also for various embodiments of the batch composition comprising pre-reacted inorganic spheroidal particles according to embodiments. As is demonstrated by the plot in FIG. 13 and by Table 6 below, the ratio of Tau Y/s is substantially higher for the batch compositions described herein than for conventional batch compositions.

For example, some embodiments shown in FIG. 13 and in Table 6 below may comprise a ratio of Tau Y/Beta that may be Tau Y/Beta≥2.0, Tau Y/Beta≥3.0, Tau Y/Beta≥4.0, Tau Y/Beta≥5.0, Tau Y/Beta≥6.0, Tau Y/Beta≥7.0, Tau Y/Beta≥8.0, or even Tau Y/Beta≥10.0. In some embodiments, the ratio of Tau Y/Beta may be 2.0≥Tau Y/Beta≥10.0. As should be recognized, values of Tau Y/Beta, which are correlated to a speed of extrusion, are substantially higher than conventional batches, which may range between about 0.85 to 1.50. Thus, batch compositions that exhibit values of Tau Y/Beta may achieve relatively high rates of extrusion.

Table 6 below illustrates the LV % (SAT), Liquid to Organic Binder Ratio, and also illustrates the rheology measurements of Tau Y, Beta, and Tau Y/Beta for various embodiments of the batch composition.

TABLE 6

Rheology Measurements of Example CMAT Batch Compositions

| Ex. # | Batch Example | LV % (SAT) | Liquid to Binder Ratio | TAU Y | BETA | TAU Y/BETA |
|---|---|---|---|---|---|---|
| 1 | CMAT | 35% | NA | 55.36 | 6.70 | 8.27 |
| 2 | CMAT | 45% | 7.50 | 21.64 | 5.39 | 4.02 |
| 3 | CMAT | 44% | 7.33 | 22.38 | 5.06 | 4.42 |
| 4 | CMAT | 48% | 6.40 | 9.02 | 4.06 | 2.22 |
| 5 | CMAT | 44% | 9.78 | 27.21 | 4.79 | 5.68 |
| 6 | CMAT | 43% | 9.56 | 30.51 | 5.00 | 6.10 |
| 7 | CMAT | 40% | 6.67 | 12.18 | 4.17 | 2.92 |
| 8 | CMAT | 47% | 7.83 | 14.44 | 13.74 | 1.05 |
| 9 | CMAT | 44% | 7.33 | 12.63 | 4.10 | 3.08 |
| 10 | CMAT | 47% | 7.83 | 19.93 | 3.11 | 6.42 |
| 11 | CMAT | 44% | 7.33 | 9.46 | 3.87 | 2.45 |
| 12 | CMAT | 44% | 7.33 | 10.60 | 4.21 | 2.52 |
| 13 | CMAT | 44% | 9.78 | 20.29 | 4.05 | 5.01 |
| 14 | CMAT | 30% | 5.25 | 55.39 | 5.52 | 10.03 |
| 15 | CMAT | 35% | 6.13 | 28.94 | 4.26 | 6.79 |
| 16 | CMAT | 37% | 6.50 | 22.76 | 3.46 | 6.59 |
| 17 | CMAT | 32% | 14.59 | NA | 7.31 | 2.00 |
| 18 | CMAT | 43% | 7.00 | 16.76 | 4.76 | 3.52 |
| 19 | CMAT | 44% | NA | 25.24 | 3.83 | 6.59 |
| 20 | CMAT | 44% | NA | 27.24 | 5.21 | 5.23 |
| 21 | CMAT | 40% | NA | 28.94 | 2.66 | 10.88 |
| 22 | CMAT | 43% | NA | 26.07 | 5.88 | 4.43 |
| 23 | CMAT | 44% | NA | 33.01 | 4.85 | 6.81 |
| 24 | CMAT | 44% | NA | 29.81 | 4.54 | 6.56 |

Processing

Figure 4A:
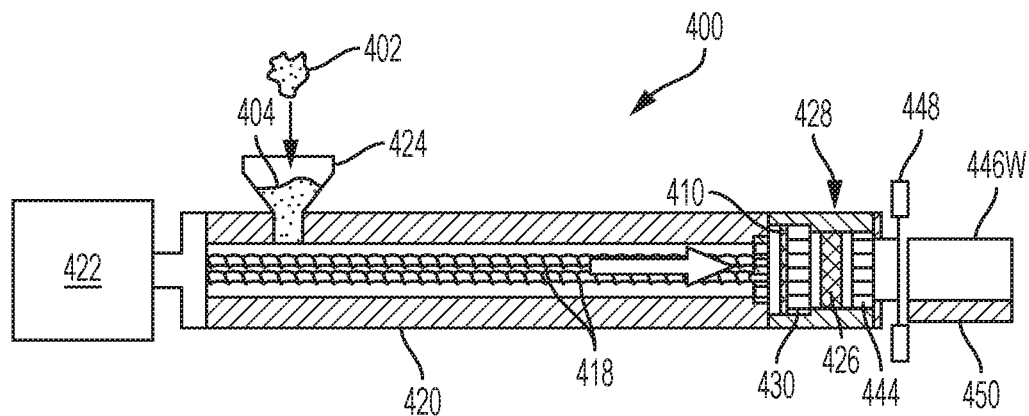
FIG. 4A is a schematic diagram of an extruder used to form wet green honeycomb bodies from batch compositions according to embodiments.
Figure 5:
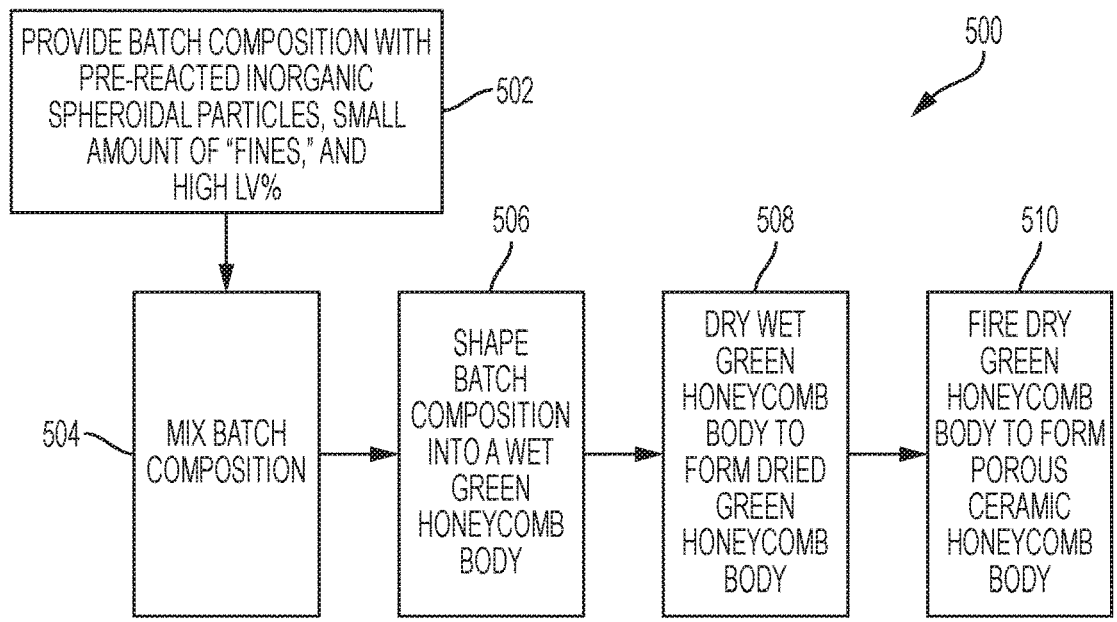
FIG. 5 illustrates a flowchart of methods of manufacturing a honeycomb body according to one or more embodiments.
Figure 6:
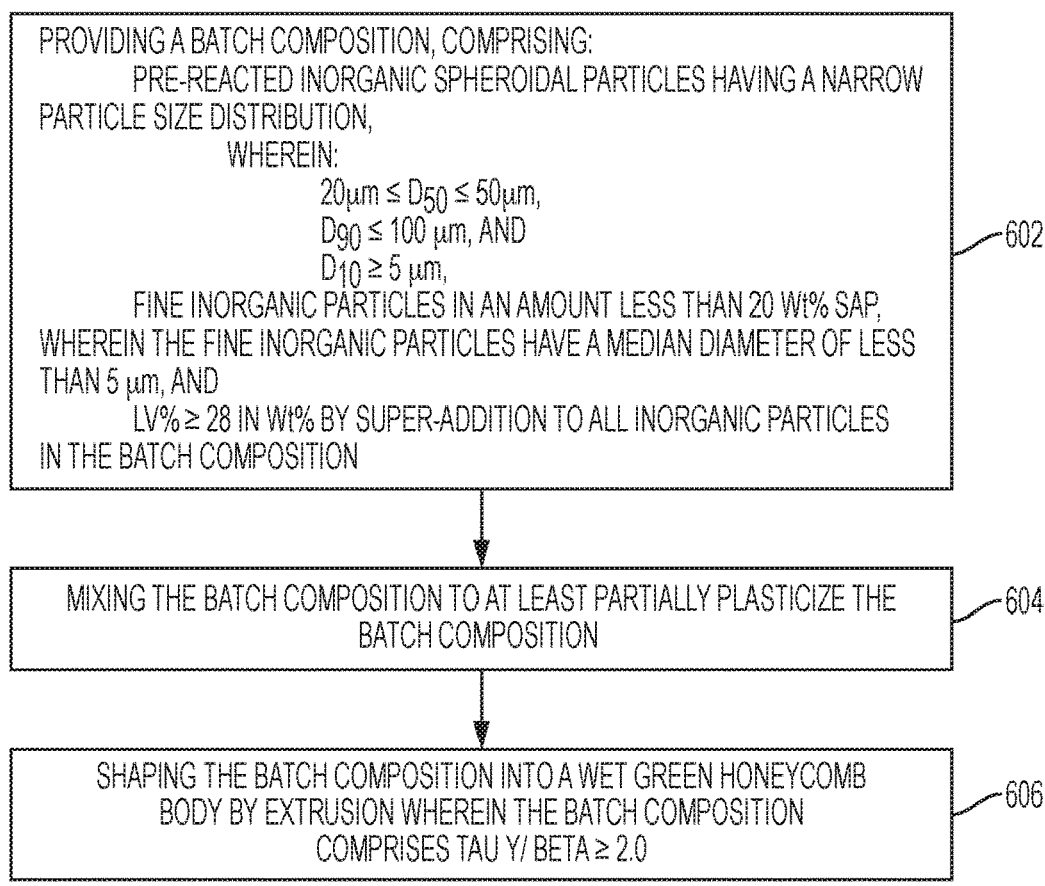
FIG. 6 illustrates a flowchart of methods of manufacturing a honeycomb body using the batch compositions according to one or more embodiments.

In another aspect, as is shown broadly in FIG. 5 and more narrowly in FIG. 6, the disclosure provides methods 500, 600 of manufacturing a honeycomb body. The methods 500, 600 may comprise an increased extrusion rate, as shaped through an extrusion die 444 (FIG. 4A), as compared to batch compositions with conventional reactive batch components. The methods of manufacturing 500, 600 comprise providing a batch composition in 502, 602 comprising pre-reacted inorganic spheroidal particles, a small amount of "fines," and a high LV % (e.g., ≥28%). In FIG. 6, the batch composition comprises, in detail in 602, pre-reacted inorganic spheroidal particles having a narrow particle size distribution, wherein the narrow particle size distribution is defined by:

20 μm≤$D_{50}$≤50 μm,
$D_{90}$≤100 μm, and
$D_{10}$≥5 μm, fine inorganic particles ("fines") in an amount less than 20 wt % SAP, wherein the "fines" have a median diameter of less than 5 µm and LV %≥28 in wt % by super-addition to all inorganic particles in the batch composition. The batch composition may further comprise added organic binder, lubricant, surfactant, and/or optical pore former(s), as is described herein.

The methods 500, 600 further comprise, in 504, 604, mixing the batch composition. The mixing in 604 may comprise additions of the LV and lubricant to the dry ingredients (pre-reacted inorganic spheroidal particles, fine inorganic particles, and organic binder) to at least partially plasticize the batch composition, i.e., provided a paste consistency.

The method 500 further comprises, in 506, shaping the batch composition into a wet green honeycomb body. In 606, the shaping may be by extrusion, wherein the properties of the batch composition comprises Tau Y/Beta≥2.0 thereby providing substantially increased extrusion rates through an extrusion die 444. Shape control is retained.

According to the method 500, the LV (e.g., deionized water) may be added in a LV % of LV≥28% SAT to the total amount of pre-reacted inorganic particles and organic particles. In other embodiments, LV≥30%, LV %≥35%, LV %≥40%, or even LV %≥45% by weight super-addition (SAT) may be added based on the total weight of inorganic particles that are present in the batch composition (pre-reacted inorganic spheroidal particles plus "fines"). In some embodiments, the LV % is such that 28%≤LV %≤50%.

The extrusion method 500 may comprise adding the organic binder, such as in the amount of between about 4.0 wt % SAT to % 8.0 wt % SAT. The organic binder, in some embodiments, may be a combination of a methylcellulose binder and a hydroxymethylcellulose binder, with between about 3.0 wt % SAT to % 6.0 wt % SAT of the methylcellulose binder, and between about 1.5 wt % SAT to 3.0 wt % SAT of the hydroxymethylcellulose binder. Some embodiments may comprise only hydroxymethylcellulose binder in an amount between about 4.0 wt % SAT to 8.0 wt % SAT, for example.

The inorganic particles, organic binder, optional pore former, LV, and lubricant may be mixed in 504, 604 by any suitable mixing apparatus or combination of mixing apparatus, such as with a Muller, auger mixer, double arm mixer, or plow blade mixer, or the like, to begin plasticization. The LV may be added to hydrate the organic binder and the inorganic particles, and the lubricant and/or surfactant may be added to the batch composition to wet out the organic binder and inorganic particles, and to form a partially-plasticized batch composition. The batch composition may be suitably shaped into a wet green honeycomb body 446W in 506 from the plasticized batch composition 404 by any suitable shaping process. For example, the wet green honeycomb body 446W may be fabricated by a forming technique, such as uniaxial or isostatic pressing, injection molding, extrusion, or the like.

The batch composition may, in some embodiments, be formed as a partially-plasticized pug 402 of material, which may be provided to an extruder 400 as shown in FIG. 4A. In other embodiments, the batch composition may be added to the extruder 400 in a continuous or semi-continuous stream of smaller amounts of material, such as small pugs or even granules or streams of partially-plasticized batch composition. As depicted in FIG. 4A and as described with reference to FIG. 5, the partially-plasticized batch composition 404 may be shaped in 506, 606 into a wet green honeycomb body 446W.

Again referring to FIG. 4A and FIG. 5, the batch composition 404, in the form of one or more pugs 402 may be provided to, and extruded from, the extruder 400 to form and shape the batch composition into a wet green honeycomb body 446W. Extrusion may be performed with any suitable type of extruder 400 that provides a suitable amount of shear to the batch composition 404. For example, a hydraulic ram extruder, a two-stage de-airing single auger, a single-screw extruder, or a twin-screw extruder, or the like may be used. An example of forming and shaping the wet green honeycomb body 446W using an extruder 400 comprising one or more screws is shown in FIG. 4A.

In more detail, the extruder 400 may comprise a screw section comprising one or more extruder screws 418 rotatable within an extruder barrel 420. The one or more extruder screws 418 may be driven by motor 422 at the inlet end of the extruder barrel 420. In the twin-screw embodiment, the extruder 400 may comprise two of extruder screws 418. Extruder barrel 420 may be provided with an inlet port 424 for introducing batch composition 404 to be further plasticized into the extruder 400. A mixer plate 426 may be positioned downstream of the screw section and may be contained within cartridge 428 mounted on the outlet end of the extruder barrel 420. After screw section, mixer plate 426 further mixes, homogenizes, and plasticizes the batch composition 404.

Also disposed within cartridge 428 are filter screen 410 and filter support 430, both positioned upstream of the mixer plate 426 with respect to the flow direction (shown as a directional arrow) of batch composition 404 being pumped by the extruder screws 418. Filter screen 410 is mounted against filter support 430 to form filter assembly configured to remove large particles, agglomerates, or debris that might plug the extrusion die 444. Preferably, filter support 430 is formed having a plurality of openings and/or slots. The extruder 400 further comprises an extrusion die 444 mounted downstream of filter assembly and mixer plate 426 at the output end of cartridge 428. The die comprises a plurality of upstream feedholes and a plurality of downstream intersecting slots. The filter assembly is operable to remove larger agglomerates and debris that might plug the slots of the extrusion die 444. Flow of the plasticized batch composition 404 through the plurality of intersecting slots of the extrusion die 444 forms the matrix of intersecting walls 102 and channels 104 in the wet green honeycomb body 446W that correspond with the honeycomb body 446D.

Thus, during operation of the extruder 400, plasticized batch composition 404 is pumped from extruder barrel 420 by the one or more extruder screws 418 and then passes through filter screen 410, filter support 430, and mixer plate 426, and finally out of the extrusion die 444 of the extruder 400 as a wet green honeycomb body 446W. The wet green honeycomb body 446W may be cut by a cutting apparatus 448 comprising a cutting implement, such as a wire. Once cut, the wet green honeycomb body 446W may be received on a tray 450.

Figure 4B:
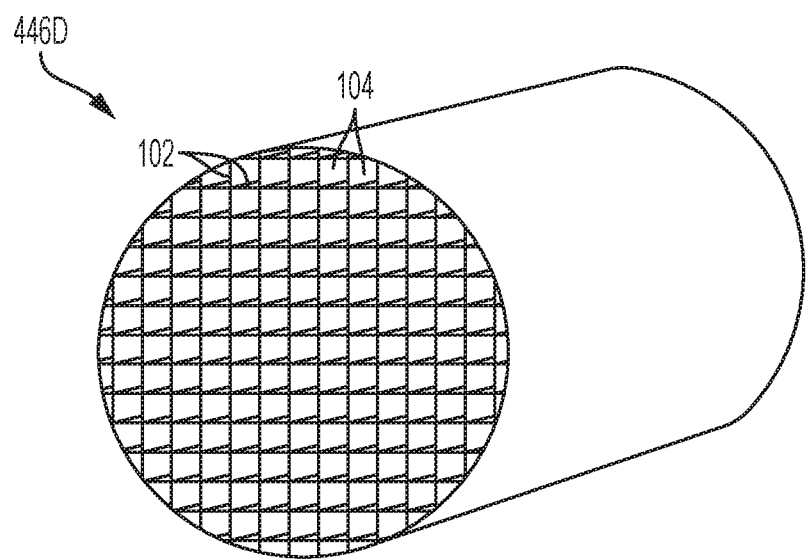
FIG. 4B illustrates an isometric view of a dried green honeycomb body produced from the batch compositions according to one or more embodiments.

The wet green honeycomb body 446W may then be dried transported by the tray 450 and a conveyor (not shown) to a dryer (not shown) and dried in 508 by any suitably drying process, such as oven drying, microwave drying, RF drying, combinations thereof, or the like to form a dried green body honeycomb 446D (FIG. 4B). The dried green body honeycomb 446D comprises the plurality of intersecting walls 102 extending from one end of the green body honeycomb 446D to the other. The intersecting walls 102 form the channels 104 that also extend from end to end.

Firing

The dried green body honeycomb 446D can then be fired in 510 according to known firing techniques, to form a porous ceramic honeycomb body 101, as is shown in FIG. 1. For example, the dried green honeycomb body 446D may be fired in a gas or electric kiln under conditions effective to convert the dried green body honeycomb 446D into a ceramic article (e.g., a porous ceramic honeycomb body 101). The firing conditions of temperature and time depend on the specific batch composition and size and geometry of the dried green body honeycomb 446D.

For example, the firing conditions effective to convert the dried green body honeycomb 446D into a porous ceramic honeycomb body 101 can comprise heating the dried green body honeycomb 446D in an air atmosphere in a furnace at heating rates of 120° C./h to a maximum soak temperature in the range of from 1000° C. to 1600° C., for example, depending upon the batch composition. The maximum soak temperature may be maintained for a hold time of between about 1 to 30 hours sufficient to convert the dried green body honeycomb 446D into a ceramic article. This may be followed by cooling at a rate sufficiently slow (e.g., a cool down rate of about 10 to 160° C./hour) so as not to thermally shock and crack the porous ceramic honeycomb body 101. Firing times further depend on factors such as kinds and amounts of particulate materials and pore former(s), and the nature of firing equipment, but total firing times may be from about 20 hours to about 80 hours, for example.

For batch compositions that are primarily for forming aluminum titanate compositions, the top firing temperatures are from about 1300° C. to about 1450° C., and the holding time at this temperature is from about 1 hour to about 6 hours.

For batch compositions that are primarily for forming aluminum titanate-mullite phase compositions, the top firing temperatures are from about 1340° C. to about 1500° C., and the holding time at this temperature is from about 1 hour to about 6 hours.

For batch compositions that are primarily for forming cordierite-mullite, aluminum-titanate (CMAT) phase compositions, the top firing temperature is from about 1300° C. to about 1380° C., and the holding time at this temperature is from about 1 hour to about 6 hours.

For batch compositions that are primarily for forming mullite, the top firing temperature is from about 1400° C. to about 1600° C. and the holding time at this temperature is from about 1 hour to about 6 hours.

For cordierite-mullite forming mixtures which yield the previously-described cordierite-mullite compositions, the top firing temperature is from about 1375° C. to about 1425° C., and the holding time at this temperature is from about 1 hour to about 6 hours.

For example, in compositions which are primarily for forming cordierite, the top firing temperature is from about 1300° C. to about 1450° C., and the holding time at this temperature is from about 1 hour to about 6 hours.

Porous Ceramic Articles Produced from the Batch Compositions

Porous ceramic articles (e.g., porous ceramic honeycomb bodies) made from batch compositions comprising pre-reacted inorganic spheroidal particles, relatively small amount of "fines" (≤20 wt % SAP of a particle distribution having median particle diameter of less than 5 μm), and LV %≥28% may, after firing, exhibit suitable open interconnected porosity and microstructure for use as a catalyst supports and/or particulate filters.

For example, in some embodiments, a relatively large median pore size (MPS), high porosity (% P), good strength and low coefficient of thermal expansion (CTE) may be provided that enable both low pressure drop and good thermal shock resistance when embodied as a particulate filter.

According to example embodiments of the disclosure, a porous ceramic honeycomb body 101 (FIG. 1) having an inverse pore structure achieves relatively high permeability. For example, the porous ceramic honeycomb body may have porosity greater than 50%, greater than 55%, or even greater than 60% in some embodiments. The porous ceramic honeycomb body 101 may have a median pore size (d50) greater than 10 μm, or even greater than 15 μm, and between 10 μm and 30 μm in some embodiments.

The porous ceramic honeycomb body 101 may have a coefficient of thermal expansion from room temperature (RT) to 800° C. less than $20 \times 10^{-7} K^{-1}$, for example, less than $15 \times 10^{-7} K^{-1}$, or even less than $10 \times 10^{-7} K^{-1}$. Furthermore, a (300/14) honeycomb body of the porous ceramic honeycomb body 101 may have a modulus of rupture (MOR) flexural strength greater than 170 psi, or even greater than 200 psi, for example.

FIG. 1 illustrates an isometric view of a porous ceramic honeycomb article 100 according to exemplary embodiments of the disclosure. The porous ceramic honeycomb article 100 is embodied as a particulate filter and comprises a first end 108 that may be an inlet end and a second end 110 opposite the first end 108 and a plurality of inlet channels 104 that extend from the first end 108 to the second end 110. Likewise, a plurality of outlet channels 106 also extend from the first end 108 to the second end 110. A plurality of intersecting walls 102 form the inlet channels 104 and outlet channels 106 and form a honeycomb matrix. The first end 108 may comprise plugs 112 at the first end 108 of the outlet channels 106. Likewise, the second end 110 (outlet end) may also comprise plugs 112 (not shown in FIG. 1) in the end of the inlet channels 104. Thus, checkerboard patterns of plugs 112 may be formed on both of the first end 108 and second end 110, in some embodiments. Other plug configurations may be used, comprising partial plug configurations where some channels are plugged and some are unplugged, i.e., flow-through channels. Porosity, median pore diameter, and pore size distribution were determined by tomography.

Cell density of the porous ceramic honeycomb body 101 can be between about 70 and 1200 cells per square inch (cpsi) (between about 10 and 190 cells per square cm). Cell wall thickness can range from about 0.025 mm to about 1.5 mm (about 0.001 to 0.060 inch). For example, porous ceramic honeycomb body 101 geometries may be 400 cpsi with a wall thickness of about 8 mil (400/8) or with a wall thickness of about 6 mil (400/6). Other geometries may comprise, for example, 100/17, 200/12, 200/19, 270/19, 350/3, 400/3, 400/4, 500/2, 600/2, 600/3. 600/4, 750/2, 900/2, 900/3, 1200/2, and even 750/1 and 900/1. Other suitable combinations may be produced using the batch compositions.

As used herein, the porous ceramic honeycomb body is intended to comprise any honeycomb structure, i.e., cell shape, and not strictly limited to a square cell shape. For example, the cells of the porous ceramic honeycomb body 101 may be square, rectangular, hexagonal, octagonal, triangular, or any other suitable cell shape. Also, while the cross section of the porous ceramic honeycomb body 101 shown is circular, the cross-sectional shape is not so limited. For example, the cross-sectional shape can be elliptical, race track, square, rectangular, or other desired geometrical shape.

Disposed at the outer periphery of the matrix of intersecting walls 102 is the outer peripheral surface. The outer peripheral surface may comprise a skin 105 herein and may in some embodiments be formed as a co-extruded skin that is co-formed with the intersecting walls 102. In other embodiments, an after-applied exterior skin may form an outer peripheral surface extending axially from a first end face to a second end face of the porous ceramic honeycomb body 101. As used herein a porous ceramic honeycomb body 101 comprises ceramic honeycomb monoliths as well as ceramic segmented honeycomb bodies, i.e., ceramic honeycomb segments that are adhered together.

It will be apparent to those skilled in the art that various modifications and variations can be made in the present disclosure without departing from the scope of the disclosure. Thus, it is intended that the present disclosure covers the modifications and variations of this disclosure provided they come within the scope of the appended claims and their equivalents.

What is claimed is:

1. A batch mixture, comprising:
    pre-reacted inorganic spheroidal particles having a narrow particle size distribution of:
    $20\ \mu m \leq D_{50} \leq 50\ \mu m$,
    $D_{90} \leq 100\ \mu m$, and
    $D_{10} \geq 5\ \mu m$;
    less than 20 wt % of fine inorganic particles by super-addition to a total weight of the pre-reacted inorganic spheroidal particles in the batch mixture, the fine inorganic particles having a median diameter of less than 5 μm; and
    LV % ≥ 28 in wt % by super-addition to all inorganic particles in the batch mixture,
    wherein LV % is liquid vehicle percent, 90% of the pre-reacted inorganic particles in the particle size distribution have a diameter of equal to or less than $D_{90}$, 10% of the pre-reacted inorganic particles have a diameter of equal to or less than $D_{10}$, and $D_{50}$ is a median particle diameter of the particle size distribution.

2. The batch mixture of claim 1, comprising $D_{10} \geq 25\ \mu m$.

3. The batch mixture of claim 1, wherein the pre-reacted inorganic spheroidal particles comprise dB≤2.00, wherein $dB=(D_{90}-D_{10})/D_{50}$.

4. The batch mixture of claim 3, wherein the pre-reacted inorganic spheroidal particles comprise dB≤0.80.

5. The batch mixture of claim 1, wherein the batch mixture comprises less than 10 wt % of fine inorganic particles having a median diameter of less than 5 μm.

6. The batch mixture of claim 1, wherein the batch mixture comprises greater than 0 wt % of the fine inorganic particles by super-addition to the total weight of the pre-reacted inorganic spheroidal particles in the batch mixture, and wherein the fine inorganic particles in the batch composition comprise fine alumina and fine silica wherein each comprises a median diameter of less than 2 μm.

7. The batch mixture of claim 1, wherein the batch mixture comprises greater than 0 wt % of the fine inorganic particles by super-addition to the total weight of the pre-reacted inorganic spheroidal particles in the batch mixture, and wherein the fine inorganic particles in the batch mixture comprise fine alumina and colloidal silica, each having particle size distributions with a median diameter of less than 1 μm.

8. The batch mixture of claim 1, comprising a ratio of a total weight of the fine inorganic particles in the batch mixture to a total weight of the pre-reacted inorganic spheroidal particles in the batch mixture of between 3:97 and 20:80.

9. The batch mixture of claim 1, wherein the pre-reacted inorganic spheroidal particles comprise an AR≤1.2, wherein AR is an average aspect ratio as measured across a first width having a largest dimension divided by second width having a smallest dimension across the pre-reacted inorganic spheroidal particles.

10. The batch mixture of claim 1, wherein the pre-reacted inorganic spheroidal particles are formed by a spray-drying process.

11. The batch mixture of claim 1, wherein a weight percent of the liquid vehicle is greater than or equal to 35 wt % by super-addition based on a total weight of all inorganic particles in the batch mixture.

12. The batch mixture of claim 1, wherein a weight percent of the liquid vehicle is greater than or equal to 45 wt % by super-addition based on a total weight of all inorganic particles in the batch mixture.

13. The batch mixture of claim 1, comprising a spherical polymer pore former.

14. The batch mixture of claim 1, wherein the pre-reacted inorganic spheroidal particles comprise a predominant crystalline phase of aluminum titanate.

15. The batch mixture of claim 1, wherein the pre-reacted inorganic spheroidal particles comprise a predominant crystalline phase of aluminum titanate and a second crystalline phase of mullite.

16. The batch mixture of claim 1, wherein the pre-reacted inorganic spheroidal particles comprise a predominant crystalline phase of aluminum titanate and a second crystalline phase of feldspar.

17. The batch mixture of claim 1, wherein the pre-reacted inorganic particles comprise a first crystalline phase predominantly of a solid solution of aluminum titanate and magnesium dititanate, and a second crystalline phase comprising cordierite.

18. The batch mixture of claim 1, wherein the pre-reacted inorganic particles comprise a weight % on an oxide basis of from 4% to 10% MgO, from 40% to 55% $Al_2O_3$, from 25% to 44% $TiO_2$, and from 5 to 25% $SiO_2$.

19. The batch mixture of claim 1, comprising a liquid vehicle to organic binder ratio of ≥6.4%.

20. A green honeycomb body comprising the batch mixture of claim 1.

21. A method of manufacturing a honeycomb body, comprising:
    mixing a batch mixture comprising pre-reacted inorganic spheroidal particles having a particle size distribution of:
    $20\ \mu m \leq D_{50} \leq 50\ \mu m$,
    $D_{90} \leq 100\ \mu m$, and
    $D_{10} \geq 5\ \mu m$,
    less than 20 wt % of fine inorganic particles by super-addition to a total weight of the pre-reacted inorganic spheroidal particles in the batch mixture, the fine inorganic particles having a median diameter of less than 5 μm, and
    LV %>28 in wt % by super-addition to all inorganic particles in the batch mixture,
    wherein 90% of the pre-reacted inorganic spheroidal particles have a diameter of less than D90, 10% of the pre-reacted inorganic spheroidal particles have a diameter of less than $D_{10}$, and $D_{50}$ is a median particle diameter; and
    shaping the batch mixture into a wet green honeycomb body by extrusion wherein the batch mixture comprises Tau Y/Beta >2.0, wherein Tau Y is a measure of batch stiffness and Beta is a friction coefficient of the batch mixture.

22. The method of claim 21, wherein Tau Y/Beta >10.0.

23. The method of claim 21, wherein the shaping comprising extrusion and $T^{onset}$ during the extrusion of greater than or equal to 47° C.

24. The batch mixture of claim 1, further comprising:
Tau Y/Beta ≥2.0;
Tau Y is a measure of batch stiffness, and Beta is a friction coefficient of the batch composition.

* * * * *

UNITED STATES PATENT AND TRADEMARK OFFICE
CERTIFICATE OF CORRECTION

PATENT NO. : 11,591,265 B2
APPLICATION NO. : 16/760154
DATED : February 28, 2023
INVENTOR(S) : Monika Backhaus-Ricoult et al.

It is certified that error appears in the above-identified patent and that said Letters Patent is hereby corrected as shown below:

In the Claims

In Column 30, Line 59, in Claim 21, delete ">28" and insert -- $\geq 28$ --.

In Column 30, Line 62, in Claim 21, delete "D90," and insert -- $D_{90}$, --.

In Column 31, Line 1, in Claim 21, delete ">2.0," and insert -- $\geq 2.0$, --.

In Column 31, Line 4, in Claim 22, delete ">10.0." and insert -- $\geq 10.0$. --.

Signed and Sealed this
Fifth Day of November, 2024

Katherine Kelly Vidal
*Director of the United States Patent and Trademark Office*